(12) United States Patent
Iyer et al.

(10) Patent No.: US 12,549,227 B2
(45) Date of Patent: Feb. 10, 2026

(54) DYNAMIC CO-CHANNEL INTERFERENCE SENSING AND AUTONOMOUS SPECTRUM MANAGEMENT USING ANTENNA ARRAYS IN WIRELESS OPERATOR NETWORKS

(71) Applicant: Nokia Solutions and Networks Oy, Espoo (FI)

(72) Inventors: Krishnan Iyer, Dunwoody, GA (US); Phy Son Nguyen, Lake Forest, CA (US); Jatin Vidhani, Livingston, NJ (US); Paul Stephens, Long Grove, IL (US)

(73) Assignee: Nokia Solutions and Network Oy, Espoo (FI)

( * ) Notice: Subject to any disclaimer, the term of this patent is extended or adjusted under 35 U.S.C. 154(b) by 130 days.

(21) Appl. No.: 18/377,332

(22) Filed: Oct. 6, 2023

(65) Prior Publication Data

US 2024/0120975 A1    Apr. 11, 2024

Related U.S. Application Data

(60) Provisional application No. 63/414,080, filed on Oct. 7, 2022.

(51) Int. Cl.
| *H04B 7/0456* | (2017.01) |
| *H04B 7/06* | (2006.01) |
| *H04B 7/08* | (2006.01) |
| *H04W 24/10* | (2009.01) |

(52) U.S. Cl.
CPC ......... *H04B 7/0473* (2013.01); *H04B 7/0695* (2013.01); *H04B 7/0857* (2013.01); *H04W 24/10* (2013.01)

(58) Field of Classification Search
CPC .................................................. H04B 7/0473
USPC ........................................................ 375/262
See application file for complete search history.

(56) References Cited

U.S. PATENT DOCUMENTS

| 2014/0029524 A1* | 1/2014 | Dimou | ................. H04W 16/10 370/328 |
| 2017/0329002 A1* | 11/2017 | Koerber | ............... H01Q 21/061 |
| 2021/0235451 A1* | 7/2021 | Parekh | ................. H04W 72/04 |

* cited by examiner

*Primary Examiner* — Lihong Yu
(74) *Attorney, Agent, or Firm* — McCarter & English, LLP

(57) ABSTRACT

A controller of a RAN detects an interferer is present in a region covered by antenna array(s) that provide a 3D view of segments of a cell, using at least a mapping from the segments to corresponding anomaly signatures, and using radio measurements taken in the segments, to determine segment(s) affected by the interferer. The controller performs mitigation of interference in the segment(s). A base station controlling the antenna array(s) determines that an event has been detected because radio measurement(s) of the segments of the cell meet an event detection threshold, and performs and sends to the controller multiple symbol-level radio measurements. The controller also causes channel sensing and radio measurements to be performed by the base station for steady state and states of interest in the cell. The controller correlates these radio measurements to map from segments to anomaly signatures and uses the mapping to perform interference mitigation.

20 Claims, 34 Drawing Sheets

|  | SSB Index Range | Data Beam Index |
|---|---|---|
| Segment 1 | #2 | #1 to #5 |
| Segment 2 | #1 | #6 to #10 |
| Segment 3 | #4 | #2 to #10 |
| Segment 4 | #5 | #15 to #20 |
| ⋮ |  |  |
| ⋮ |  |  |
| Segment n-1 | #7 | #200 to #205 |
| Segment n | #8 | #250 to #256 |

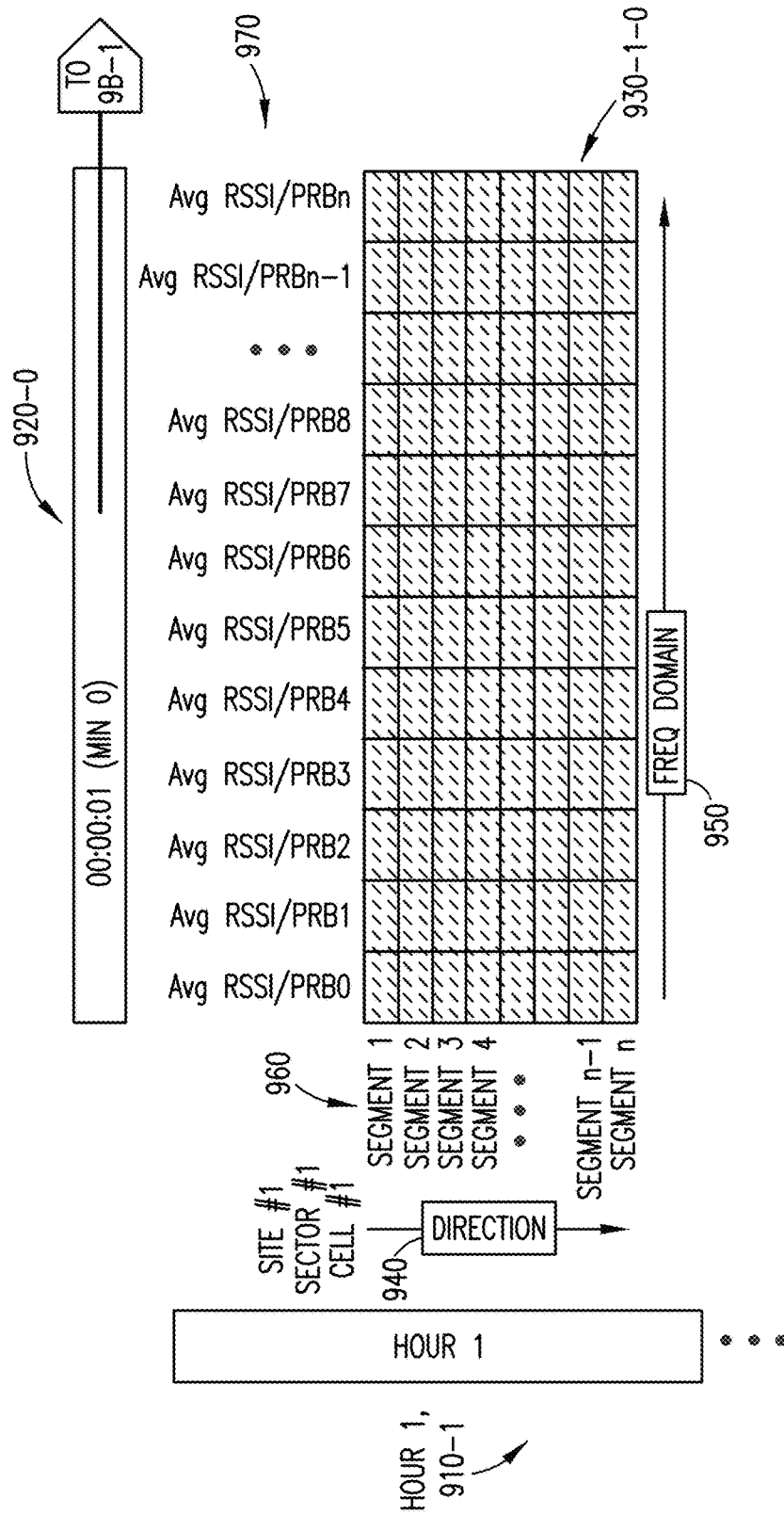

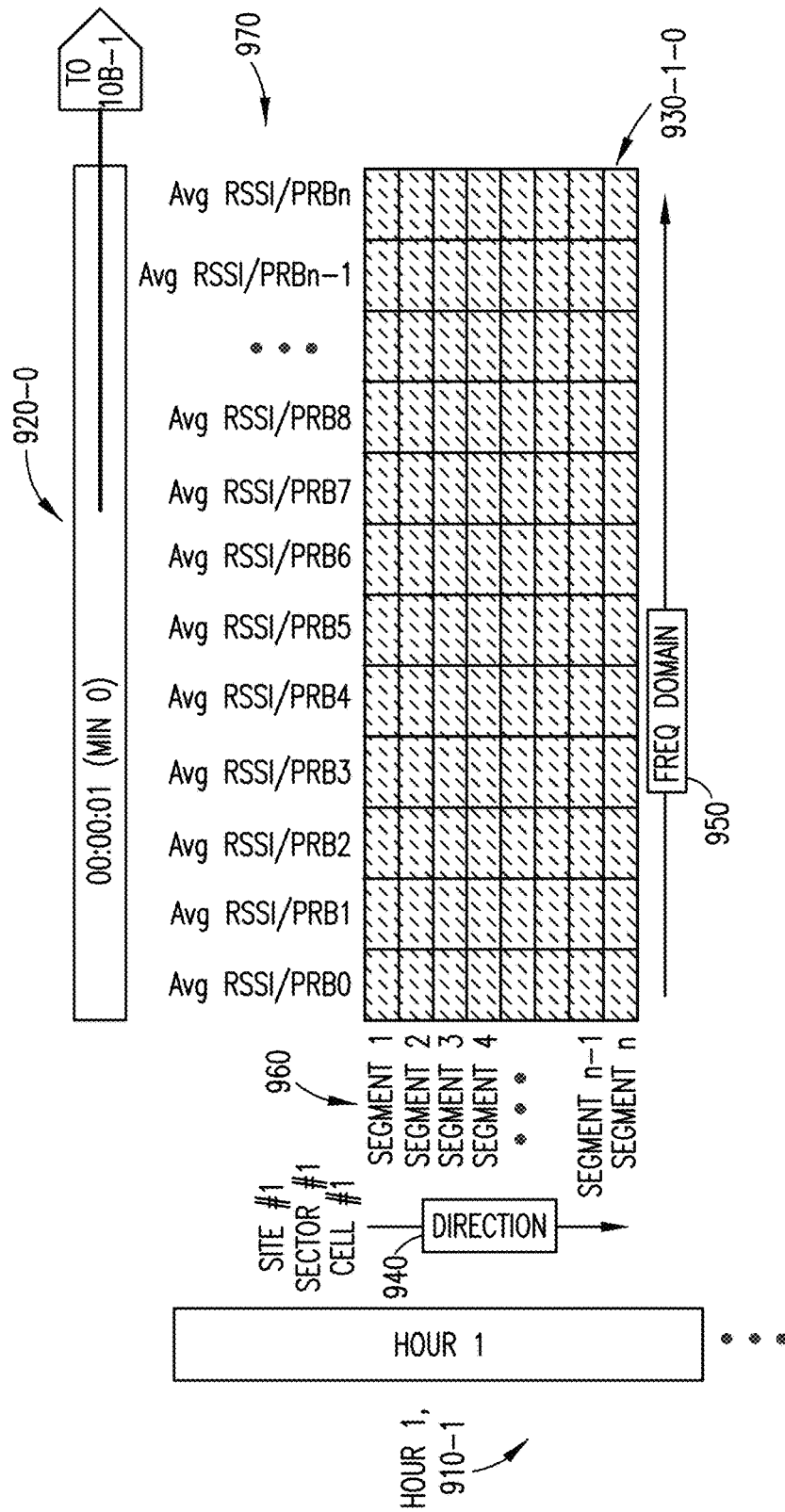

DYNAMIC CO-CHANNEL INTERFERENCE SENSING AND AUTONOMOUS SPECTRUM MANAGEMENT USING ANTENNA ARRAYS IN WIRELESS OPERATOR NETWORKS

CROSS-REFERENCE TO RELATED APPLICATION

The present application claims the benefit under 35 U.S.C. § 119(e) of U.S. Provisional Patent Application No. 63/414,080, filed on Oct. 7, 2022, the disclosure of which is hereby incorporated by reference in its entirety. Any and all applications for which a foreign or domestic priority claim is identified in the Application Data Sheet of the present application are hereby incorporated by reference under 37 CFR § 1.57.

TECHNICAL FIELD

Exemplary embodiments herein relate generally to wireless communications and, more specifically, relates to interference sensing and spectrum management in a wireless system.

BACKGROUND

The Department of Defense (DoD) is exploring spectrum allocation in the mid-band (3.1-3.55 GHz) which will be shared with commercial 5G (fifth generation) systems. This spectrum currently supports numerous DoD operated fixed/mobile air, shipborne, and terrestrial radar systems for various mission-critical operations. In addition, this band is also allocated for aeronautical radio navigation and other non-federal uses. Radar altimeter (4.2-4.4 GHz) operation may also be impacted by adjacent channel interference (3.7-4.2 GHz) by 5G operations in this band.

A need in this area is to design a system that dynamically manages this spectrum in near real time in accordance with rapidly-changing scenarios. For example, one problem to solve is to detect presence of co-primary federal users in this band and take action to prioritize these users over commercial users.

BRIEF SUMMARY

This section is intended to include examples and is not intended to be limiting.

In an exemplary embodiment, a method is disclosed that includes detecting, in a controller of a radio access network of a wireless network, an interferer is present in a region covered by one or more antenna arrays that provide a three-dimensional view of segments of a cell. The detecting uses at least a mapping from the segments to corresponding anomaly signatures, and uses radio measurements taken in the segments, to determine one or more segments affected by the interferer. The method includes performing, by the controller of the radio access network, mitigation of interference in the one or more segments.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories storing instructions that, when executed by the one or more processors, cause the apparatus at least to perform: detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer; and performing, by the controller of the radio access network, mitigation of interference in the one or more segments.

An exemplary computer program product includes a computer-readable storage medium bearing computer program code embodied therein for use with a computer. The computer program code includes: code for detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer; and code for performing, by the controller of the radio access network, mitigation of interference in the one or more segments.

In another exemplary embodiment, an apparatus comprises means for performing: detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer; and performing, by the controller of the radio access network, mitigation of interference in the one or more segments.

In an exemplary embodiment, a method is disclosed that includes determining, at a base station controlling one or more antenna arrays that provide a three-dimensional view of segments of a cell in a wireless network, that an event has been detected because one or more radio measurements of the segments of the cell meet an event detection threshold. The method further includes performing by the base station multiple symbol-level radio measurements in response to the event detection threshold being met. The method also includes sending, by the base station to a controller of a radio access network of a wireless network, multiple symbol-level radio measurement reports corresponding to the multiple symbol-level radio measurements.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories storing instructions that, when executed by the one or more processors, cause the apparatus at least to perform: determining, at a base station controlling one or more antenna arrays that provide a three-dimensional view of segments of a cell in a wireless network, that an event has been detected because one or more radio measurements of the segments of the cell meet an event detection threshold; performing by the base station multiple symbol-level radio measurements in response to the event detection threshold being met; and sending, by the base station to a controller of a radio access network of a wireless network, multiple symbol-level radio measurement reports corresponding to the multiple symbol-level radio measurements.

An exemplary computer program product includes a computer-readable storage medium bearing computer program code embodied therein for use with a computer. The computer program code includes: code for determining, at a base station controlling one or more antenna arrays that provide a three-dimensional view of segments of a cell in a wireless network, that an event has been detected because one or more radio measurements of the segments of the cell meet an event detection threshold; code for performing by the base station multiple symbol-level radio measurements in response to the event detection threshold being met; and code for sending, by the base station to a controller of a radio access network of a wireless network, multiple symbol-level radio measurement reports corresponding to the multiple symbol-level radio measurements.

In another exemplary embodiment, an apparatus comprises means for performing: determining, at a base station controlling one or more antenna arrays that provide a three-dimensional view of segments of a cell in a wireless network, that an event has been detected because one or more radio measurements of the segments of the cell meet an event detection threshold; performing by the base station multiple symbol-level radio measurements in response to the event detection threshold being met; and sending, by the base station to a controller of a radio access network of a wireless network, multiple symbol-level radio measurement reports corresponding to the multiple symbol-level radio measurements.

In an exemplary embodiment, a method is disclosed that includes causing, by a controller of a radio access network of a wireless network, channel sensing in a region covered by one or more antenna arrays that provide a three-dimensional view of segments of a cell, in order to form a mapping between the segments and beams able to be formed by the base station and used by the controller. The method includes causing, by the controller of the radio access network, radio measurements to be performed by the base station, using the beams, of the segments of the cell during a steady state phase without an interferer in the region, and during a state of interest having one or more interferers in the region. The method further includes performing, by the controller of the radio access network, at least correlation of the radio measurements between the steady state and state of interest to determine a mapping from the segments to corresponding anomaly signatures. The method includes using, by the controller of the radio access network, the mapping from the segments to corresponding anomaly signatures and the mapping between the segments and beams to perform mitigation of interference in the region.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories storing instructions that, when executed by the one or more processors, cause the apparatus at least to perform: causing, by a controller of a radio access network of a wireless network, channel sensing in a region covered by one or more antenna arrays that provide a three-dimensional view of segments of a cell, in order to form a mapping between the segments and beams able to be formed by the base station and used by the controller; causing, by the controller of the radio access network, radio measurements to be performed by the base station, using the beams, of the segments of the cell during a steady state phase without an interferer in the region, and during a state of interest having one or more interferers in the region; performing, by the controller of the radio access network, at least correlation of the radio measurements between the steady state and state of interest to determine a mapping from the segments to corresponding anomaly signatures; and using, by the controller of the radio access network, the mapping from the segments to corresponding anomaly signatures and the mapping between the segments and beams to perform mitigation of interference in the region.

An exemplary computer program product includes a computer-readable storage medium bearing computer program code embodied therein for use with a computer. The computer program code includes: code for causing, by a controller of a radio access network of a wireless network, channel sensing in a region covered by one or more antenna arrays that provide a three-dimensional view of segments of a cell, in order to form a mapping between the segments and beams able to be formed by the base station and used by the controller; code for causing, by the controller of the radio access network, radio measurements to be performed by the base station, using the beams, of the segments of the cell during a steady state phase without an interferer in the region, and during a state of interest having one or more interferers in the region; code for performing, by the controller of the radio access network, at least correlation of the radio measurements between the steady state and state of interest to determine a mapping from the segments to corresponding anomaly signatures; and code for using, by the controller of the radio access network, the mapping from the segments to corresponding anomaly signatures and the mapping between the segments and beams to perform mitigation of interference in the region.

In another exemplary embodiment, an apparatus comprises means for performing: causing, by a controller of a radio access network of a wireless network, channel sensing in a region covered by one or more antenna arrays that provide a three-dimensional view of segments of a cell, in order to form a mapping between the segments and beams able to be formed by the base station and used by the controller; causing, by the controller of the radio access network, radio measurements to be performed by the base station, using the beams, of the segments of the cell during a steady state phase without an interferer in the region, and during a state of interest having one or more interferers in the region; performing, by the controller of the radio access network, at least correlation of the radio measurements between the steady state and state of interest to determine a mapping from the segments to corresponding anomaly signatures; and using, by the controller of the radio access network, the mapping from the segments to corresponding anomaly signatures and the mapping between the segments and beams to perform mitigation of interference in the region.

In an exemplary embodiment, a method is disclosed that includes performing, by a base station under configuration of a controller of a radio access network of a wireless network, channel sensing in a region covered by one or more antenna arrays coupled to the base station that provide a three-dimensional view of segments of a cell, in order to form a mapping by the base station between the segments and beams. The method includes reporting by the base station information from the channel sensing to the controller. The method further includes performing, by the base station under configuration by the controller, radio measurements, using the beams, of the segments of the cell during a steady state phase without an interferer in the region, and during a state of interest having one or more interferers in the region. The method also includes reporting the radio measurements from the base station to the controller, and controlling, by the base station using configuration from the controller, at least the beams to perform mitigation of interference in the region.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories storing instructions that, when executed by the one or more processors, cause the apparatus at least to perform: performing, by a base station under configuration of a controller of a radio access network of a wireless network, channel sensing in a region covered by one or more antenna arrays coupled to the base station that provide a three-dimensional view of segments of a cell, in order to form a mapping by the base station between the segments and beams; reporting by the base station information from the channel sensing to the controller; performing, by the base station under configuration by the controller, radio measurements, using the beams, of the segments of the cell during a steady state phase without an interferer in the region, and during a state of interest having one or more interferers in the region; reporting the radio measurements from the base station to the controller; and controlling, by the base station using configuration from the controller, at least the beams to perform mitigation of interference in the region.

An exemplary computer program product includes a computer-readable storage medium bearing computer program code embodied therein for use with a computer. The computer program code includes: code for performing, by a base station under configuration of a controller of a radio access network of a wireless network, channel sensing in a region covered by one or more antenna arrays coupled to the base station that provide a three-dimensional view of segments of a cell, in order to form a mapping by the base station between the segments and beams; code for reporting by the base station information from the channel sensing to the controller; code for performing, by the base station under configuration by the controller, radio measurements, using the beams, of the segments of the cell during a steady state phase without an interferer in the region, and during a state of interest having one or more interferers in the region; code for reporting the radio measurements from the base station to the controller; and code for controlling, by the base station using configuration from the controller, at least the beams to perform mitigation of interference in the region.

In another exemplary embodiment, an apparatus comprises means for performing: performing, by a base station under configuration of a controller of a radio access network of a wireless network, channel sensing in a region covered by one or more antenna arrays coupled to the base station that provide a three-dimensional view of segments of a cell, in order to form a mapping by the base station between the segments and beams; reporting by the base station information from the channel sensing to the controller; performing, by the base station under configuration by the controller, radio measurements, using the beams, of the segments of the cell during a steady state phase without an interferer in the region, and during a state of interest having one or more interferers in the region; reporting the radio measurements from the base station to the controller; and controlling, by the base station using configuration from the controller, at least the beams to perform mitigation of interference in the region.

DETAILED DESCRIPTION

Figure 1:
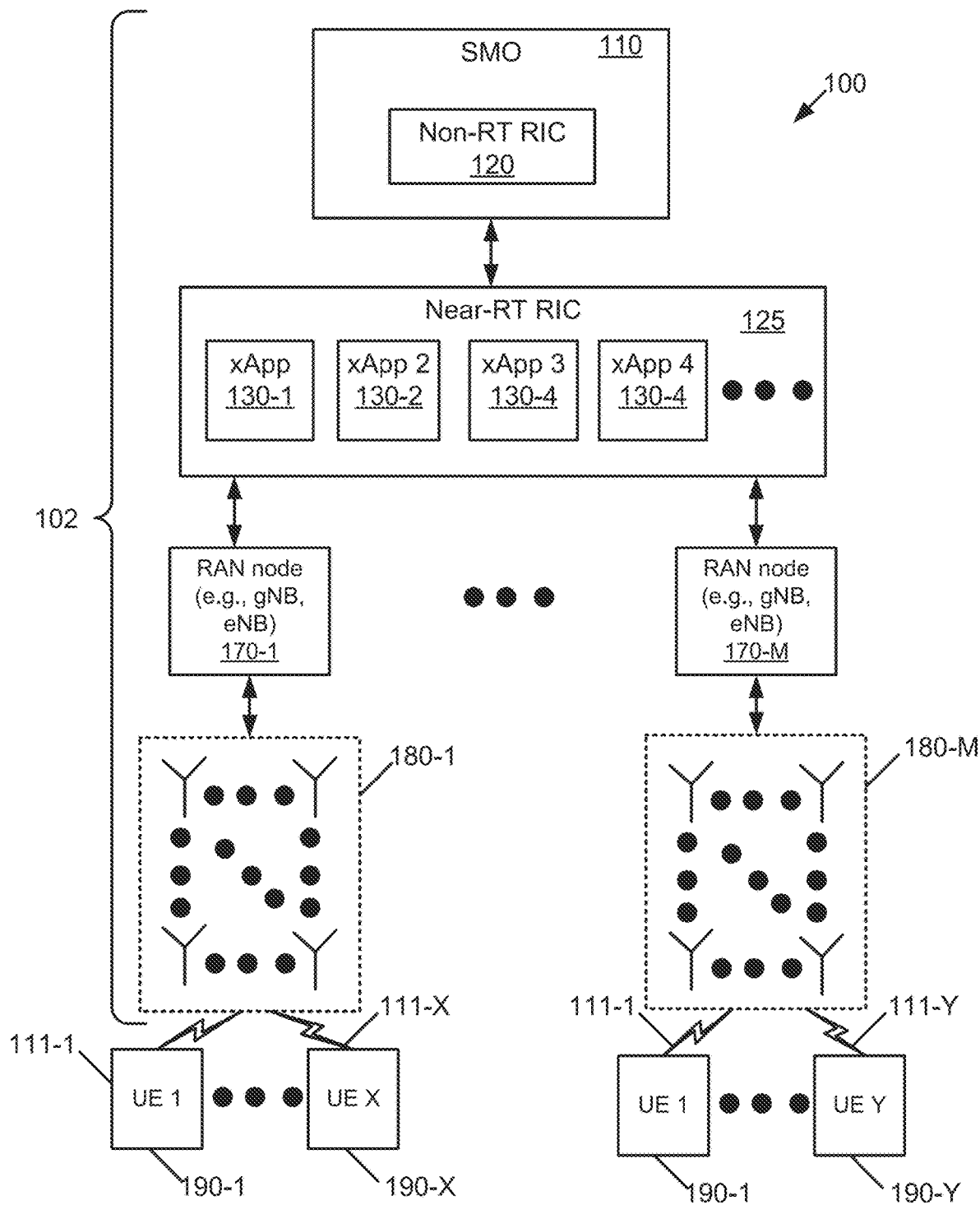
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as either "or", "and", or "both".

The exemplary embodiments herein describe techniques for dynamic co-channel interference sensing and autonomous spectrum management using, e.g., mMIMO antenna arrays in a wireless operator network. Additional description of these techniques is presented after a system into which the exemplary embodiments may be used is described.

Turning to FIG. 1, this figure shows a block diagram of one possible and non-limiting exemplary system in which the exemplary embodiments may be practiced. The system 100 includes a wireless network (e.g., controlled by an operator) 102 having an SMO 110 having a non-RT RIC 120, and these are connected to the near-RT RIC 125. The near-RT RIC 125 includes multiple xApps 130, of which four are shown: xApp 130-1; xApp 130-2; xApp 130-3; and xApp 130-4. An xAPP is an application designed to run on the Near-RT RIC. Such an application is likely to consist of one or more microservices and at the point of on-boarding will identify which data it consumes and which data it provides. The application is independent of the near-RT RIC and may be provided by any third party. The E2 enables a direct association between the xApp and the RAN functionality. The near-RT RIC 125 communicates with M RAN nodes, 170-1 through 170-M. The RAN nodes 170 communicate with UEs 190 using multiple (M) mMIMO antenna arrays 180 (which may also be referred to as an antenna module).

As a point of clarity, the mMIMO antenna arrays 180 will perform the sensing herein, as directed by a corresponding gNB 170 (e.g., or DU of the same). This may also involve some information determination, such as metrics like the average (avg) RSSI/PRB, which is one example metric used below. This information is reported from the mMIMO antenna arrays 180 to their corresponding gNBs 170. The gNBs 170 control all aspects of the mMIMO antenna arrays 180, such as directing them to measure and report information, and the like.

In this example, the UEs 1 190-1 through X 190-X communicate with the RAN node 170-1 via wireless links 111-1 through 111-X. Similarly, the UEs 1 190-1 through X 190-Y communicate with the RAN node 170-N via wireless links 111-1 through 111-Y. The RAN nodes 170 may be gNBs, which are NR base stations, or may be eNBs, which are LTE base stations. Note also that a NR RAN node 170 may include both gNB and eNB capabilities. For instance, in 5G, the RAN node 170 may be a NG-RAN node, which is defined as either a gNB or an ng-eNB. Regardless of type of node, these RAN nodes 170 provide access to a wireless network for the UEs 190. Since gNBs and eNBs are possible for RAN nodes 170, the nodes 170 will also be referred to as gNBs 170 or eNBs 170. The RAN nodes 170 may communicate with the near-RT RIC 125 via an E2 interface.

Figure 1A:
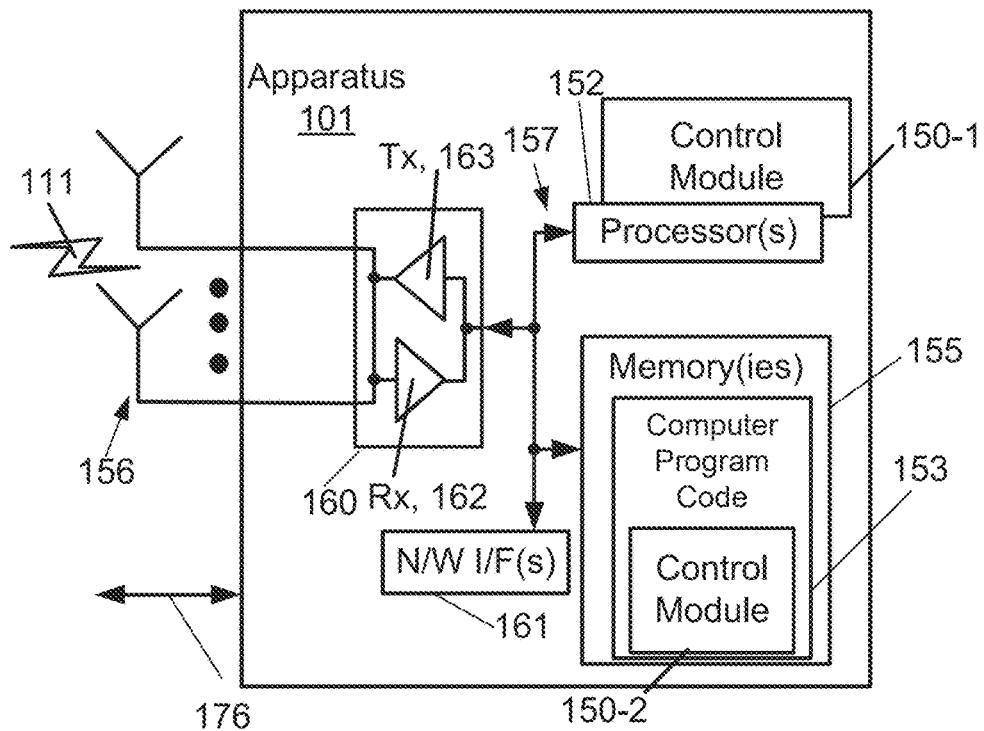
FIG. 1A illustrates a possible apparatus that may be used to implement one of the nodes in FIG. 1, in accordance with an exemplary embodiment.

FIG. 1A illustrates a possible apparatus that may be used to implement one of the nodes 120, 125, 170, or 190 in FIG. 1, in accordance with an exemplary embodiment. The apparatus 101 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 156, such as the antenna array 180 as in FIG. 1, which communicates using a wireless link 111. The one or more memories 155 include computer program code 153.

The apparatus 101 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the apparatus 101 to perform one or more of the operations as described herein.

The one or more network interfaces 161 communicate over a network such as via the wired link(s) 176. The wired link(s) 176 may be electrical, such as ethernet, or optical, or any other non-wireless links. Two or more apparatuses 101 may also communicate using, e.g., link(s) 176 (and/or via wireless link 111). The one or more buses 157 may be address, data, or control buses, and may include any interconnection mechanism, such as a series of lines on a motherboard or integrated circuit, fiber optics or other optical communication equipment, wireless channels, and the like.

Having thus introduced one suitable but non-limiting technical context for the practice of the exemplary embodiments, the exemplary embodiments will now be described with greater specificity.

As described above, the DoD is exploring spectrum allocation in the mid-band (3.1-3.55 GHz) which will be shared with commercial 5G systems. This spectrum currently supports numerous DoD operated fixed/mobile air, shipborne, and terrestrial radar systems for various mission-critical operations. In addition, this band is also allocated for aeronautical radio navigation and other non-federal uses. Radar altimeter (4.2-4.4 GHz) operation may also be impacted by adjacent channel interference (3.7-4.2 GHz) by 5G operations in this band.

Further, all current mechanisms available today with CBRS band sharing have detection latencies of ~60 seconds and channel evacuation time of ~240 seconds which is inadequate for airborne and other rapidly moving federal systems. Exemplary embodiments herein, using a 5G FR1 TDD system, can meet the current latency objective of less than one second with 5G channel evacuation time of less than five seconds. Exemplary embodiments can significantly improve bidirectional end-to-end latencies to enable spectrum sharing with rapidly-moving federal systems whose trajectories are unknown to the 5G network.

There is a clear need for a designing a system that dynamically manages this spectrum in near-real-time in accordance with fast-changing scenarios. The exemplary embodiments herein offer a unique solution that can dynamically detect co-channel interference due to spectrum sharing and autonomously manage spectrum, for instance using mMIMO antenna systems and RAN Intelligent Controllers (RICs).

That is, exemplary embodiments provide methods for dynamic co-channel interference sensing and autonomous spectrum management, e.g., using mMIMO antenna arrays and RICs in a wireless operator network. The entire process may leverage software features within the 5G TDD gNB, mMIMO antenna array radio along with harnessing AI/ML and pattern recognition capabilities of the Near RT-RIC, which is getting data directly from the gNBs 170, to take preemptive action on gNBs that enables autonomous and dynamic sharing of spectrum resources between multiple parties.

Figure 2:
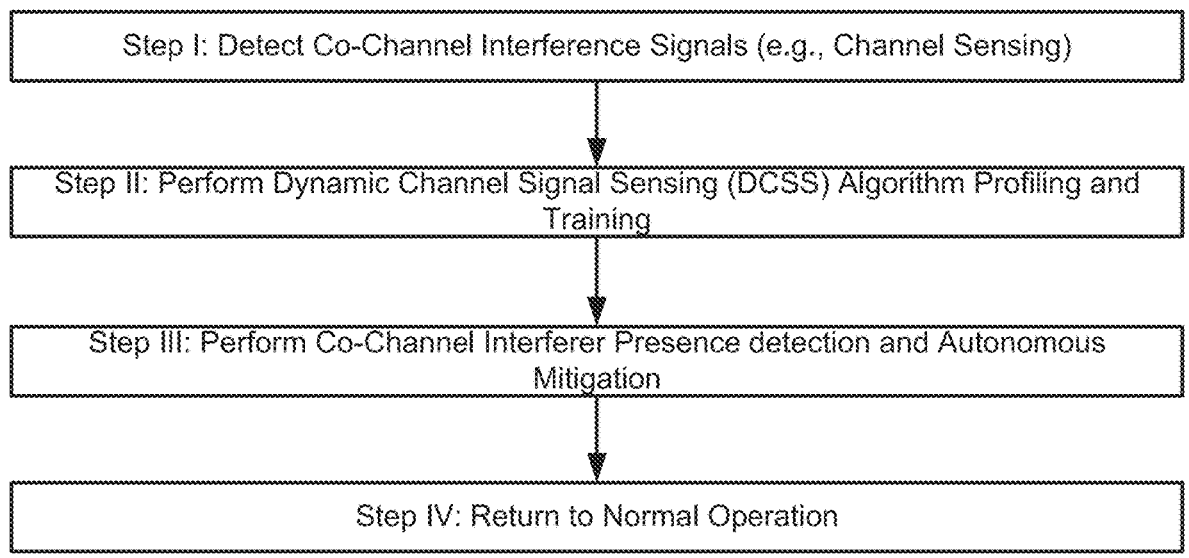
FIG. 2 is a logic flow diagram presenting an overview of steps performed in order to provide dynamic co-channel interference sensing and autonomous spectrum management.
Figure 3:
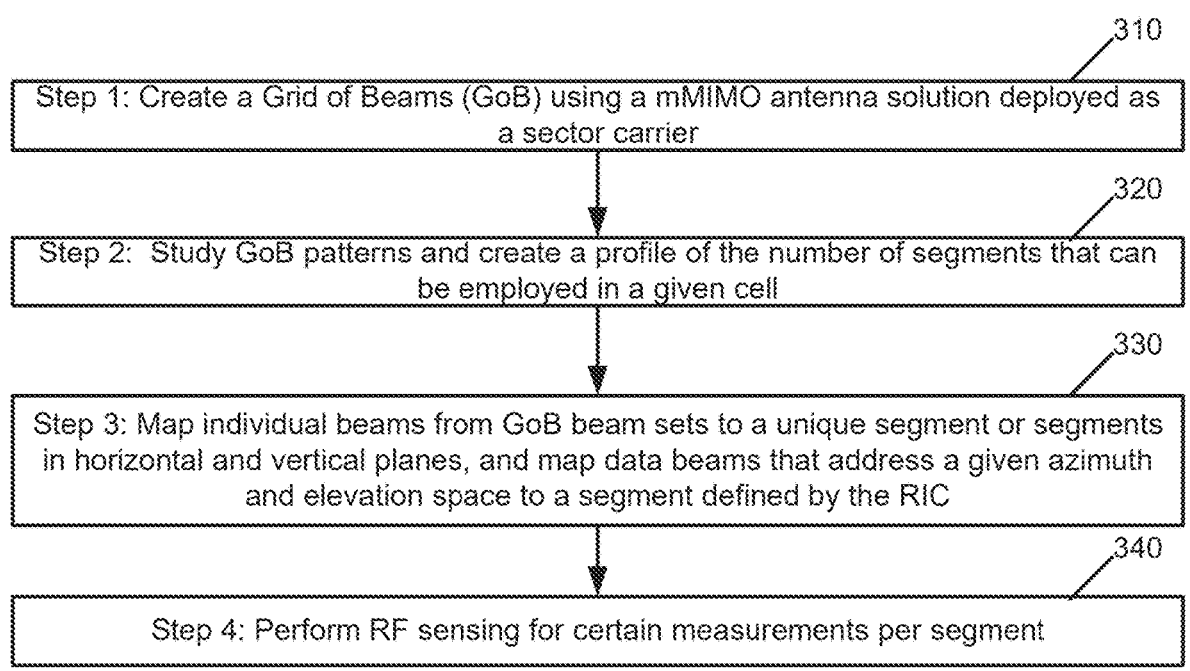
FIG. 3 is a logic flow diagram presenting an overview of steps performed in order to segment space using a standard GoB (Grid of Beams)

An exemplary method uses four broad steps to realize the dynamic channel sensing and autonomous spectrum management. The steps are outlined as in FIG. 2, and details on each step will be presented below. FIG. 2 is a logic flow diagram presenting an overview of steps performed in order to provide dynamic co-channel interference sensing and autonomous spectrum management. This figure and other flow diagrams or signaling diagrams herein illustrate the operation of an exemplary method or methods, a result of execution of computer program instructions embodied on a computer readable memory, functions performed by logic implemented in hardware, and/or interconnected means for performing functions in accordance with exemplary embodiments. FIG. 2 includes the following exemplary steps.

Step I: Detect co-channel interference signal (e.g., channel sensing). Examples of this are illustrated at least by FIGS. 3 to 7.

Figure 8:
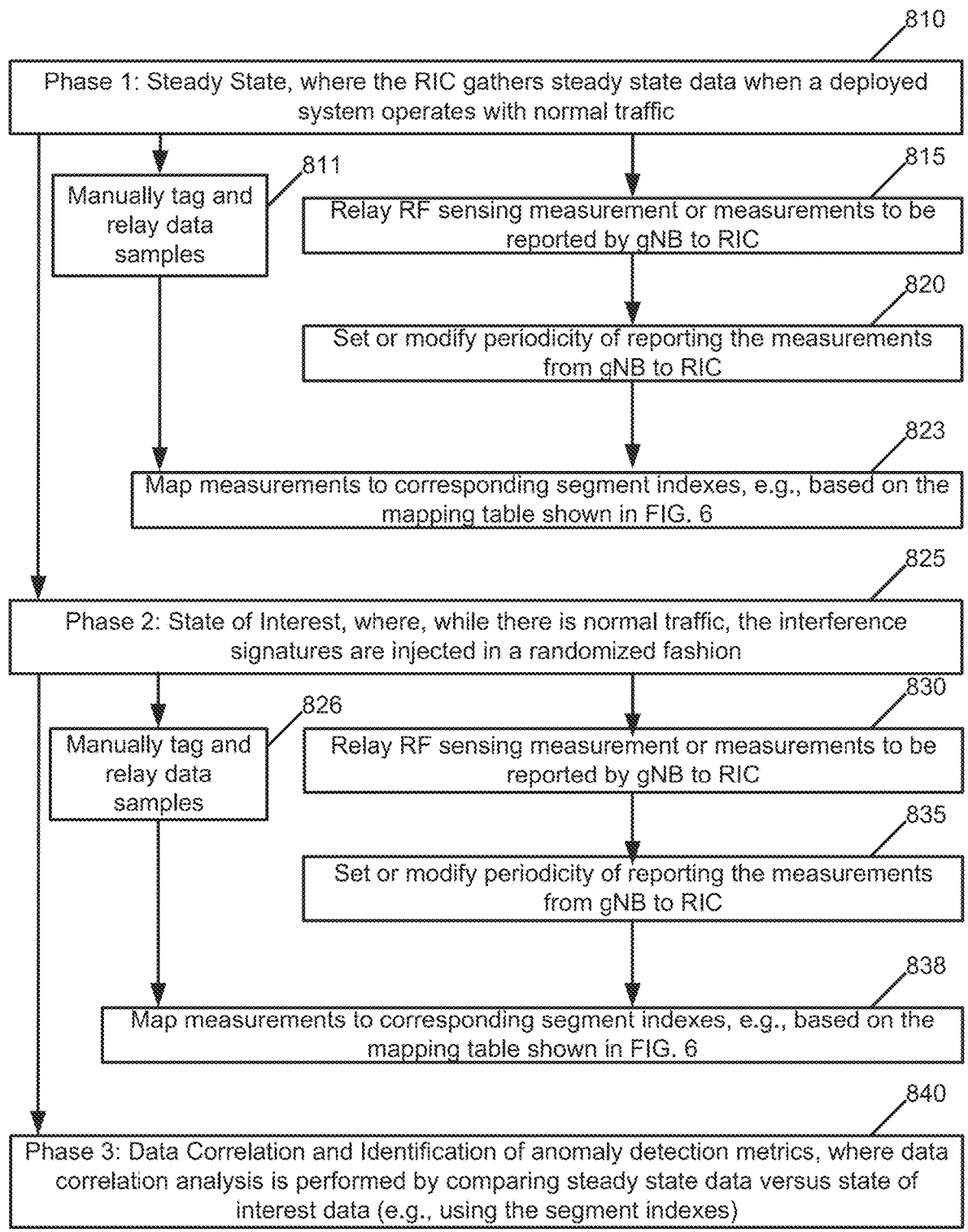
FIG. 8 is a logic flow diagram presenting steps taken to identify metrics that can be used to detect presence of a co-channel interferer, and may be performed by a DCSS algorithm in a RIC.

Step II: Perform Dynamic Channel Signal Sensing (DCSS) algorithm profiling and training. An example of this is illustrated by FIG. 8.

Figure 14:
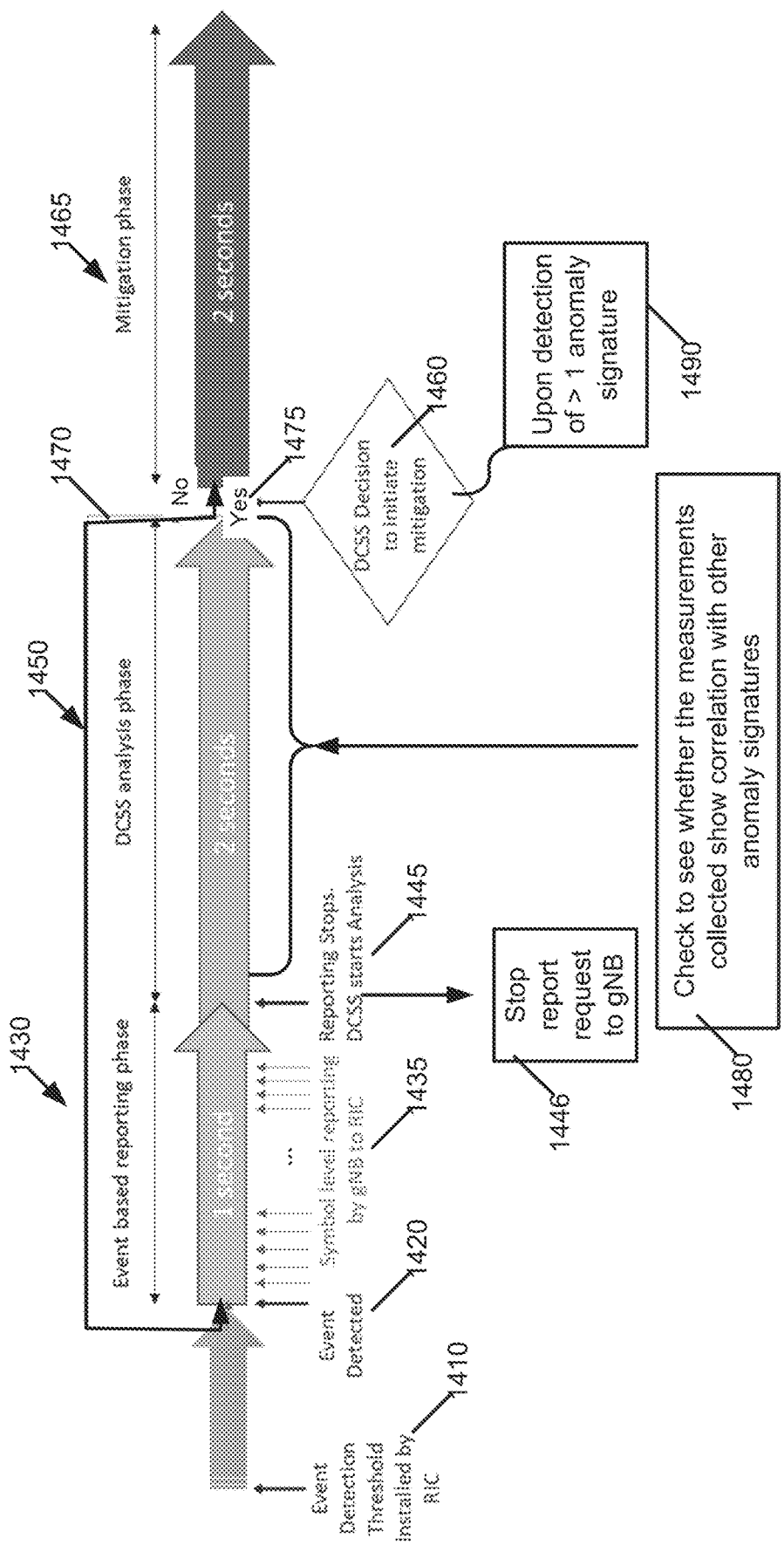
FIG. 14 illustrates a summary of main phases during detection and mitigation step.

Step III: Perform co-channel interferer presence detection and autonomous mitigation. An example of this is illustrated by FIG. 14.

Figure 16:
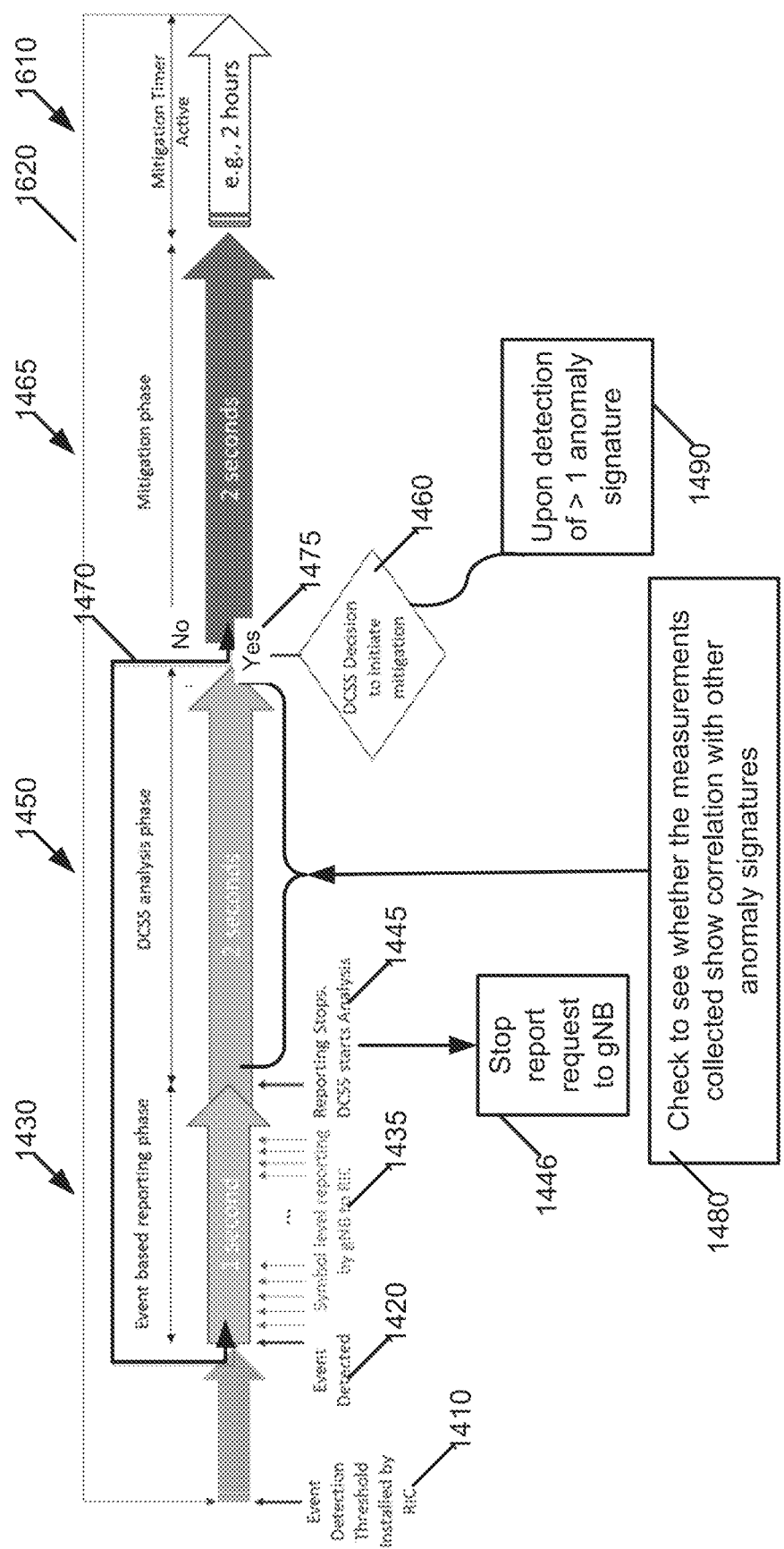
FIG. 16 illustrates a summary of return to normal operation flow, which extends the summary of FIG. 14.

Step IV: Return to normal operation. An example of this is illustrated by FIG. 16.

The details of these steps are provided below. For ease of reference, headings are used, which correspond in part to the steps in FIG. 2.

The exemplary embodiments provide methods for dynamic co-channel interference sensing and autonomous spectrum management, e.g., using mMIMO antenna arrays and RICs in a wireless operator network. The four steps shown in FIG. 2 are now described in further detail.

A. Step I. Detecting Co-Channel Interference Signal (e.g., Channel Sensing)

The nature of a mMIMO antenna system is that it allows sampling three-dimensional space (e.g., azimuth and elevation) by employing a grid of beams. The grid of beams enable capability to sample at least the UL signal in a directional manner by employing multiple degrees of freedom (e.g., space, frequency and/or time). Two exemplary approaches ("Method 1" and "Method 2") are proposed herein to efficiently detect the UL signal. The approaches are as described as follows.

The first approach is referred to as "Method 1", and is applied to segmenting space using a standard GoB (Grid of Beams). This method is described in part through reference to FIG. 3, which is a logic flow diagram presenting an overview of steps performed in order to segment space using a standard GoB (Grid of Beams).

Step 1: Create a Grid of Beams (GoB) using a mMIMO antenna module deployed as a sector carrier. See block 310. A sector carrier is one radio channel with a certain bandwidth deployed by a customer to cover a geographical area. The GoB may be configured by the Near-Rt RIC, but is implemented on the gNB (including corresponding Massive MIMO antenna arrays). A subset of the GoB is used as SSBs (e.g., to carry PBCH, MIBs, PSS, SSS, Cell specific Reference Signals, and the like), another subset is used for CSI-RS (Channel State Specific-Reference Signals for the UE to report PMI for data beam selection) while others can be used as data beams (e.g., to carry PDSCH channels). The cell will be split into segments creating a grid in a spherical plane as depicted in FIGS. 4 and 5.

Figure 4:
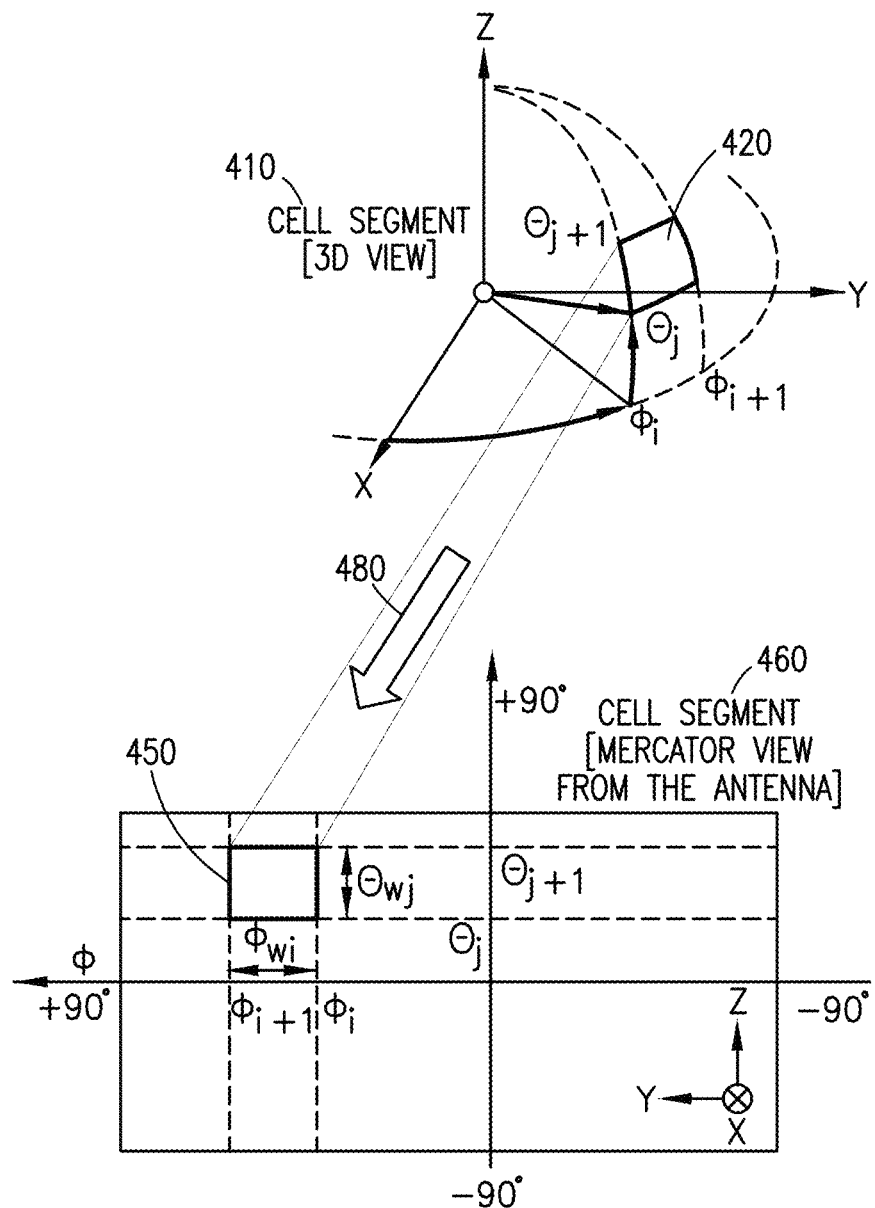
FIG. 4 illustrates creating segments in 3D space using Azimuth (T) and elevation (θ) angles.

FIG. 4 illustrates creating segments in 3D space using azimuth ($\Phi$) and elevation ($\theta$) angles. There is a 3D view 410 illustrating a cell segment 420, between azimuth angles $\phi_i$ to $\phi_{i+1}$, and between elevation angles $\theta_j$ to $\theta_{j+1}$. This is mapped (represented by reference 480) to cell segment 450 in the Mercator (e.g., flat) view 460 from the antenna. The Mercator view 460 is in the y-z plan, and the x axis is oriented into the page.

Figure 5:
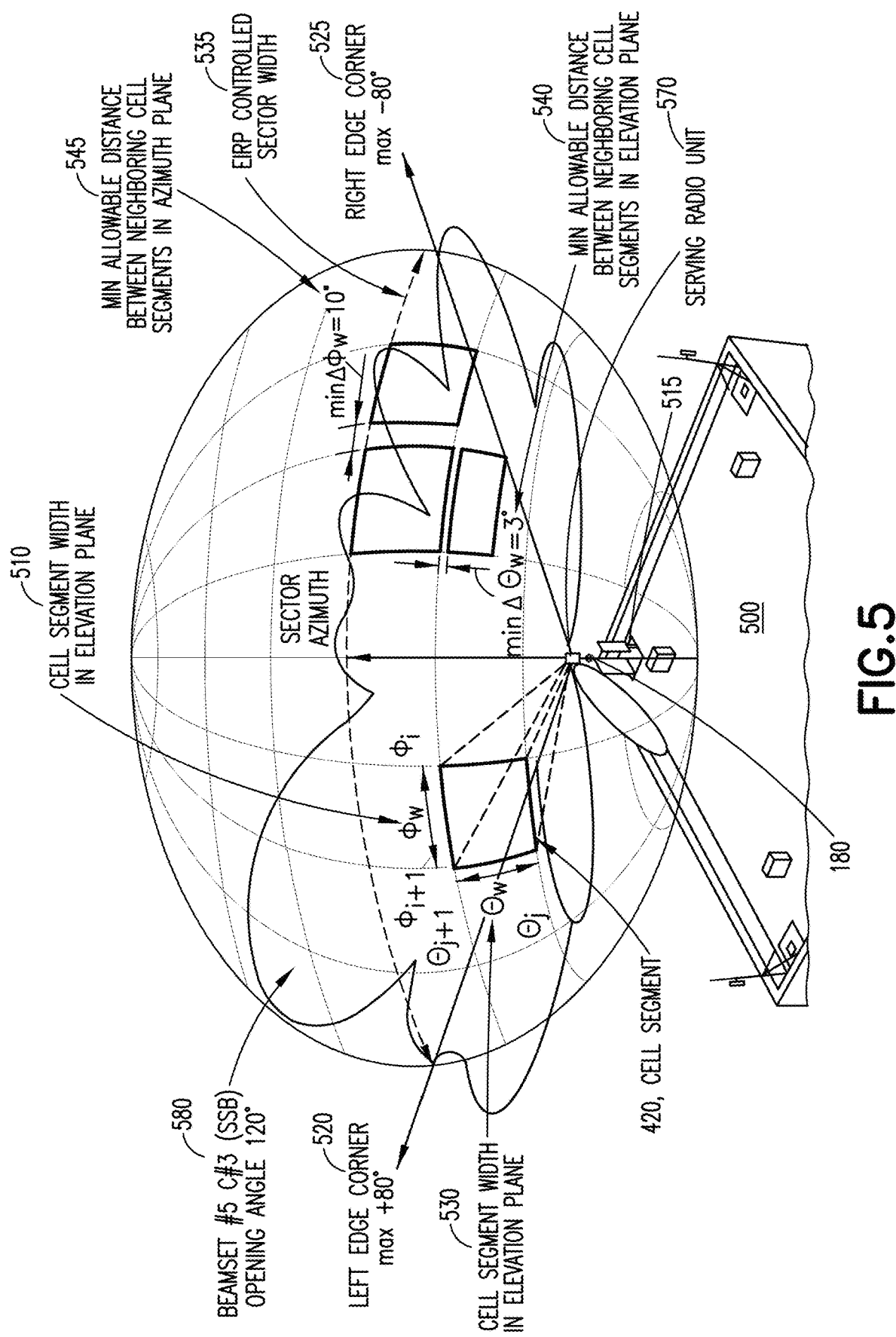
FIG. 5 illustrates an example of segmentation in 3D space.

FIG. 5 illustrates an example of segmentation in 3D space. There is a tower 515 on a building 500, and the tower 515 has an antenna array 180, which is controlled by a service radio unit 570 to create one or more cells. Another example of a cell segment 420 is shown, and the cell segment width 510 in the azimuth plane is from the left edge corner 520 (being a maximum, max, of 80 degrees from zero) to the right edge corner 525 (being a maximum of −80 degrees from zero). Reference 530 indicates the cell segment width in the elevation plane. Reference 535 indicates an EIRP controlled sector width. Reference 540 indicates the minimum (min) distance between neighboring cell segments in the elevation plane, which is the following: min $\Delta\theta_W=3°$, or three degrees. Reference 545 indicates the minimum (min) allowable distance between neighboring cell segments in the azimuth plane, which is min $\Delta\theta\phi_W=10°$, or ten degrees.

Multiple beams are illustrated in what is a complex beam pattern. One example of a beam is indicated by reference 580, where beam set #5 #3 (for SSB) with an opening angle of 120°.

Returning to FIG. 3, in Step 2: A Near-RT (near-real-time) RIC (RAN Intelligent Controller) will have a database of the GoBs that are deployed in a given cell and also across all the cells in a cluster of sites that are being managed by the RIC. The RIC can study the GoB patterns and create a (e.g., an optimized) profile of the number of segments that can be employed in a given cell. See block 320. It is noted this may be performed by a DCSS Controller xAPP (described below) on the Near RT RIC 125 and results passed to the gNB 170.

Figures 6, 7:
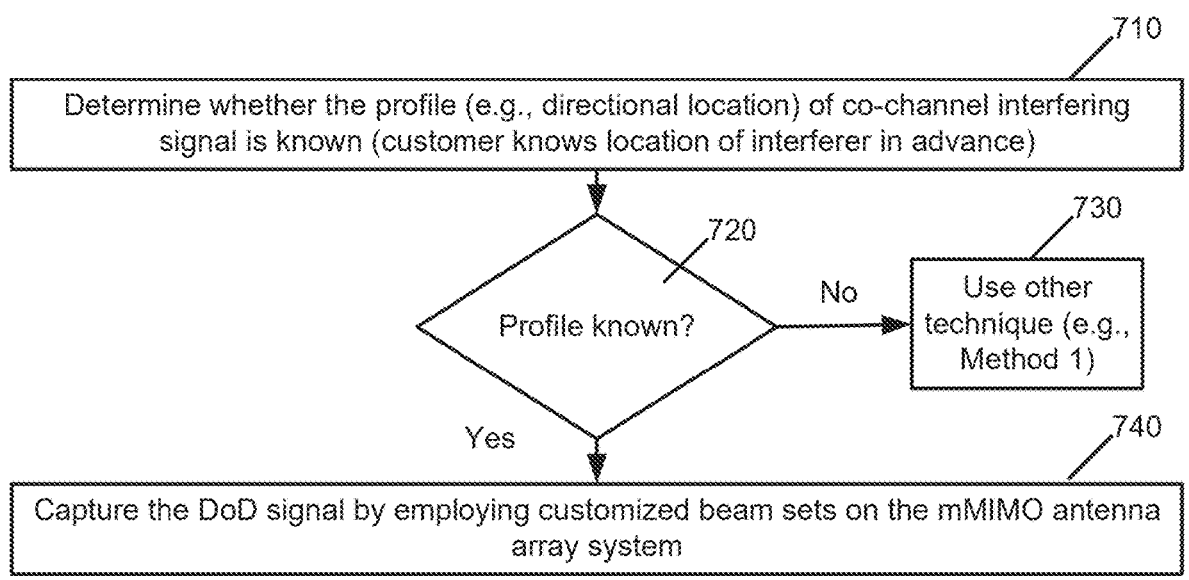
FIG. 6 is a table illustrating mapping of SSB and data beams to segments.
FIG. 7 is a logic flow diagram presenting steps used to detect co-channel interference signals by segmenting space using customized beam sets.

Step 3: Each beam from a GoB beam set will be mapped by the RIC to a unique segment or segments in horizontal and vertical planes, e.g., SSB, CSI-RS, and data beams that address a given azimuth and elevation space will be mapped to a segment defined by the RIC. See block 330. An example of this mapping is depicted in FIG. 6, where n segments are mapped to SSB index ranges from 1 to 8, and to corresponding data beam indexes from 1 to 256. This may be performed by a DCSS Controller xAPP (described below) on the Near RT RIC and results passed to the gNB 170.

Step 4: RF sensing (performed by the antenna module 180 and reported to and configured by the corresponding gNB 170) will be performed (see block 340) using one or more of the following exemplary certain measurements per segment:
1) DL: RSRQ (RSRP/RSSI), CQI (Channel Quality Indicator);
2) UL: SRS (Sounding Reference Signal), RSSI (Receive Signal Strength Indicator), RTWP
3) SSI/RTWP per SSB; and/or
4) RSSI per PRB.

RSSI per PRB (RSSI/PRB) will be used as an example below, but this is only one example. The measurements performed in block 340 are used to detect co-channel interference signal (e.g., channel sensing), and examples of outputs are illustrated below (e.g., see FIGS. 9 and 10).

A second approach is referred to as "Method 2", and is applied to segmenting space using customized beam sets, which are sets of beams that can be implemented and customized. In this method, if the profile (e.g., directional in space) of co-channel interfering signal is known, then it is possible to employ customized beam patterns on the mMIMO antenna array system that can capture the DoD signal. FIG. 7 is a logic flow diagram presenting steps used to detect co-channel interference signals by segmenting space using customized beam sets. In block 710, it is determined whether the profile (e.g., directional location) of co-channel interfering signal is known. This may occur if the customer (that is, the operator of the system) knows the location of an interferer in advance. If the profile is known (block 720=Yes), the block 740, the DoD signal is captured by employing customized beam sets on the mMIMO antenna array system. It is noted that block 740 results in the captured beam patterns, which may be used in the future to employ those customized beam sets to adjust to a DoD interferer. If the profile is not known (block 720=No), in block 730, another technique is used to detect co-channel interference signals, such as Method 1 of FIG. 3. The customized beam sets would then be used in the steps that follow.

B. Step II: Perform Dynamic Channel Signal Sensing (DCSS) Algorithm Profiling and Training This step outlines the 'Dynamic Co-channel Signal Sensing (DCSS) algorithm' within the Near-RT RIC 125. The DCSS algorithm will identify key metrics that can be used to detect presence of a co-channel interferer. The DCSS algorithm can use single or multiple RF sensing measurements (RSRQ, CQI, RSSI/PRB, and the like) defined in the section above to detect presence of a co-channel interferer. In this document, we assume RSSI/PRB measurement is the RF sensing measurement used by DCSS algorithm, but this is for ease of reference and only one example. The DCSS algorithm will collect and analyze the RSSI/PRB data measurements over multiple phases (such as steady state, state of interest) and generate various anomaly detection metrics (such as data correlation and anomaly detection metrics phase) that can be used to detect presence of an interferer or interferers. Exemplary various steps used by DCSS algorithm are outlined below, in relation to FIG. 8, which is a logic flow diagram presenting steps taken to identify metrics that can be used to detect presence of a co-channel interferer.

Phase 1: Steady State—This is the phase when the DCSS algorithm gathers steady state data when deployed system operates with normal traffic. See block 810, where the Near-RT RIC 125 gathers steady state data when a deployed system operates with normal traffic. During this phase, there is no interferer activity present. The duration of this phase could be two to four weeks or more. Alternatively, the data samples could be tagged manually as 'with Interferer (State of Interest)' or 'Clean Data (Steady State)' as well based on Date, Time, and the like, see block 811. The alternative could be used, e.g., with machine learning systems such as neural networks, where training involves known "clean" samples and known "with interferer" samples, but this also likely requires manual tagging. These manually tagged samples are assumed to be relayed (or otherwise transmitted) to the Near-RT RIC.

The DCSS algorithm in the RIC, upon initiation of this phase, may undertake following actions:
1) Relay RF sensing measurement or measurements to be reported by gNB to the Near-RT RIC (see block 815); and
2) Set or modify periodicity of reporting the measurements from gNB to RIC (see block 820).

It is assumed in Phase 1 that the RIC will request the gNBs to report RSSI/PRB report for every beam employed (e.g., based on beam index number) with, e.g., a one-minute (min) periodicity. Every time beams are employed, and RSSI/PRB measurements with beam index are received by RIC via an E2 interface, the RIC maps (see block 823) the measurement to corresponding segment index, e.g., based on the mapping table shown in FIG. 6. The RSSI/PRB measurement reported by gNB to RIC via E2 interface and the mapping to segments performed by RIC is as depicted in FIGS. 9A, 9B, and 9C, which illustrate steady state RSSI/PRB reporting in Phase 1 between cells and RIC over an E2 interface.

Figures 2, 9A:
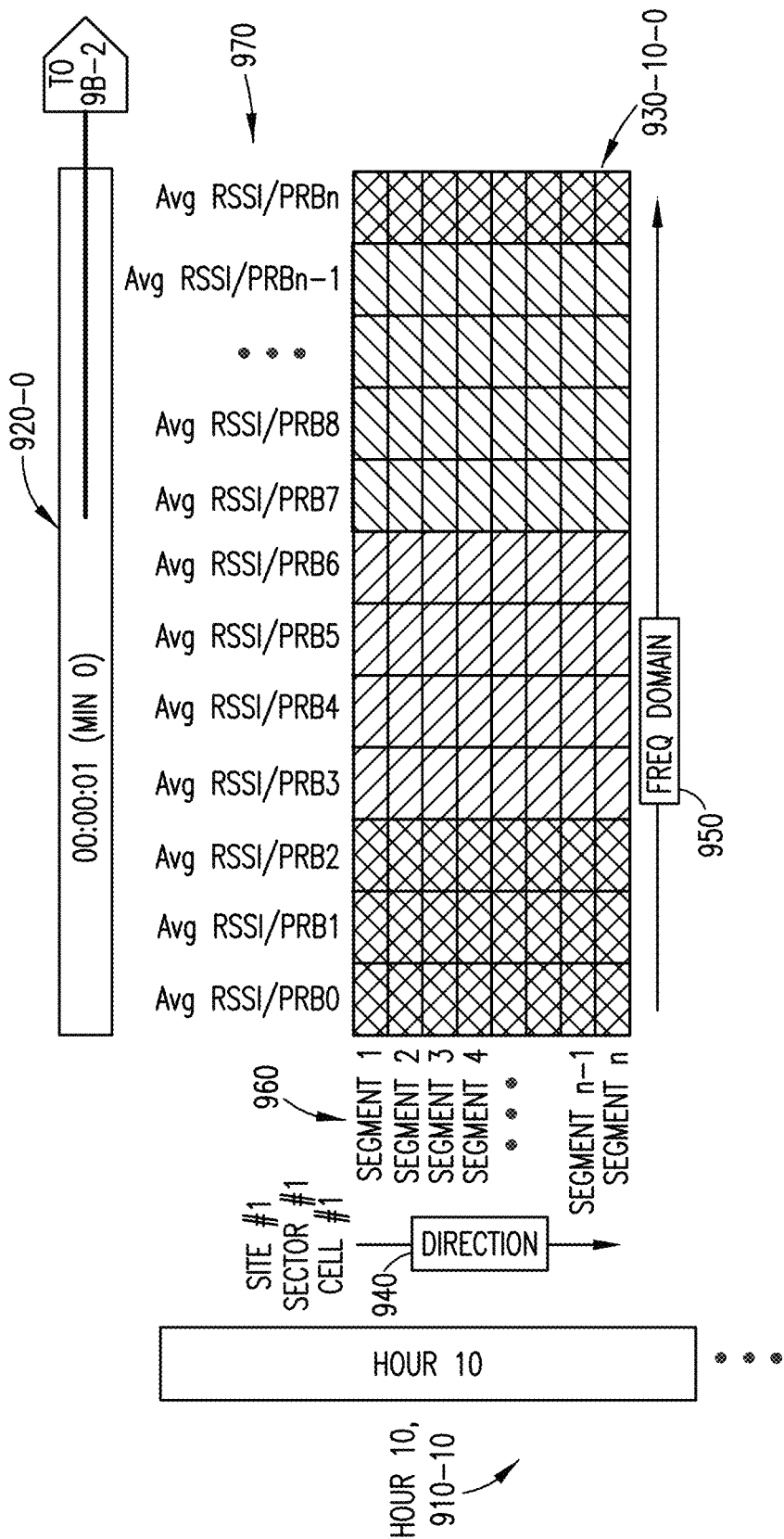
FIGS. 9A, 9B, and 9C illustrate steady state RSSI/PRB reporting in Phase 1 between cells and RIC over an E2 interface.
Figures 3, 9A:
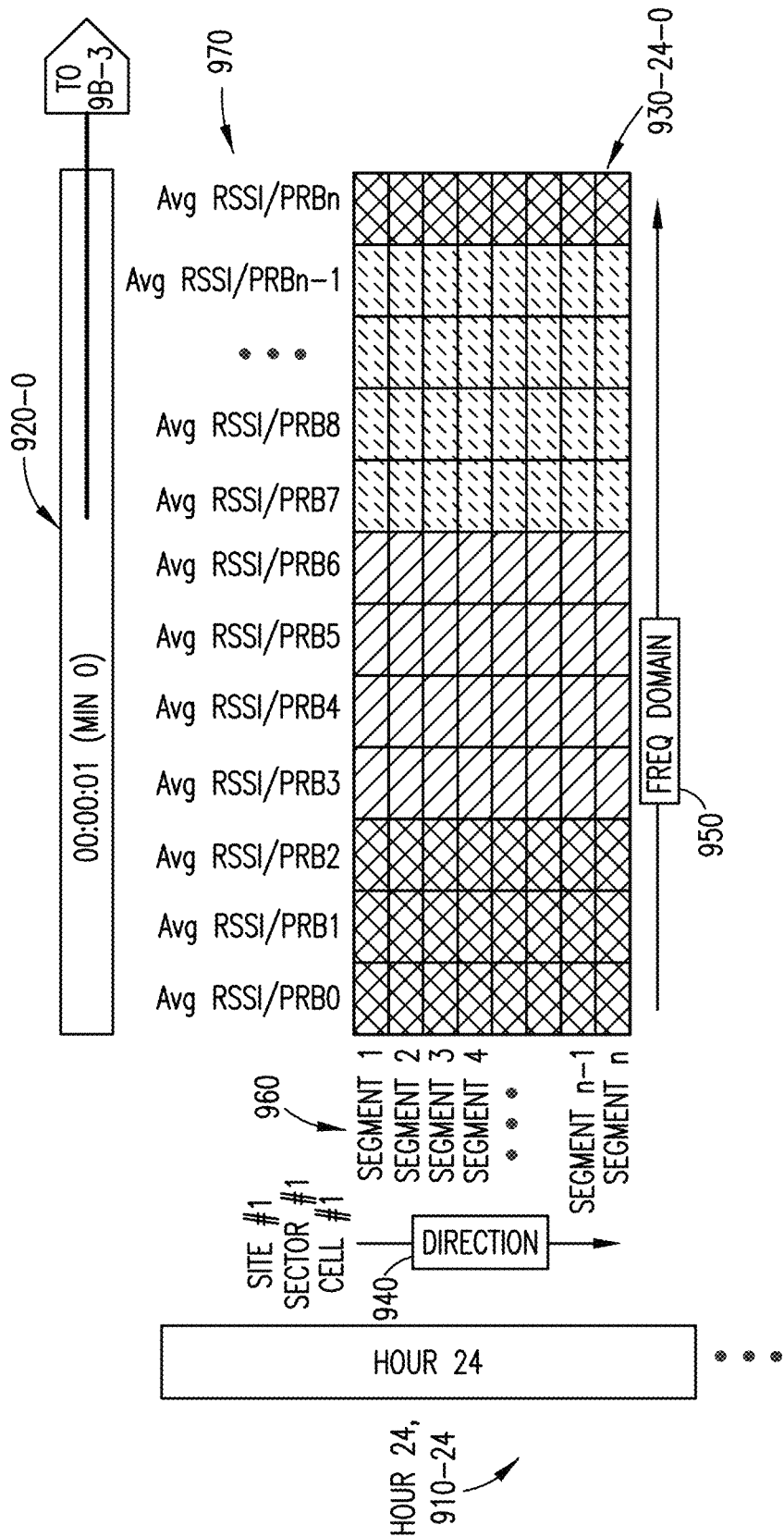

Referring to FIG. 9A, the left side is split into hours, and hours 910-1, 910-10, 910-24, corresponding to hours 1, 10, and 24 out of a day, are shown. This is for Site #1, Sector #1, Cell #1. For these hours, data is taken per a corresponding table 930. Three tables are illustrated: 930-1-0; 930-10-0; and 930-24-0, where "1-0" indicates the first hour and the zeroth minute 920-0, "10-0" indicates the $10^{th}$ hour and zeroth minute, and "24-0" indicates $24^{th}$ hour and the zeroth minute. This numbering system is used in FIGS. 9B and 9C too. Each table 930 has n segments 960 in space and n sections (PRBs) of frequency domain 950. The direction 940 of measuring is from segment 1 to segment n. The metric measured in the frequency domain 950 is the average (Avg) RSSI/PRB 970, though other metrics can be used. This example has zero (0) to n PRBs, each of which has an average RSSI. The darker the color of an entry, the more interference there is. It is noted that "n" is used for both 960 and 970, but this is not meant to imply the number of segments 960 is equivalent to the number of PRBs in 970. That is, "n" for 960 and 970 can be different.

Figures 1, 9B:
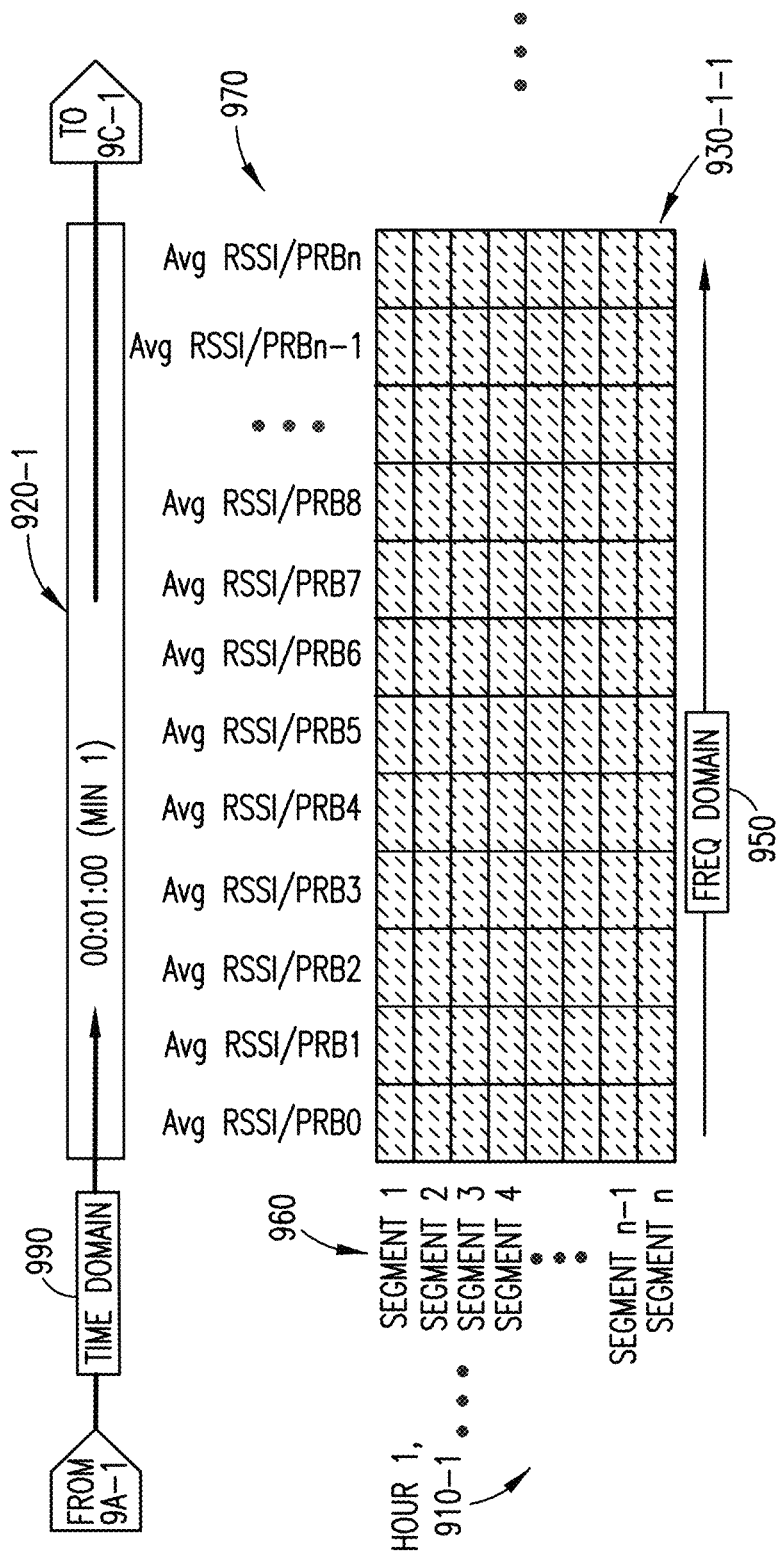
Figures 2, 9B:
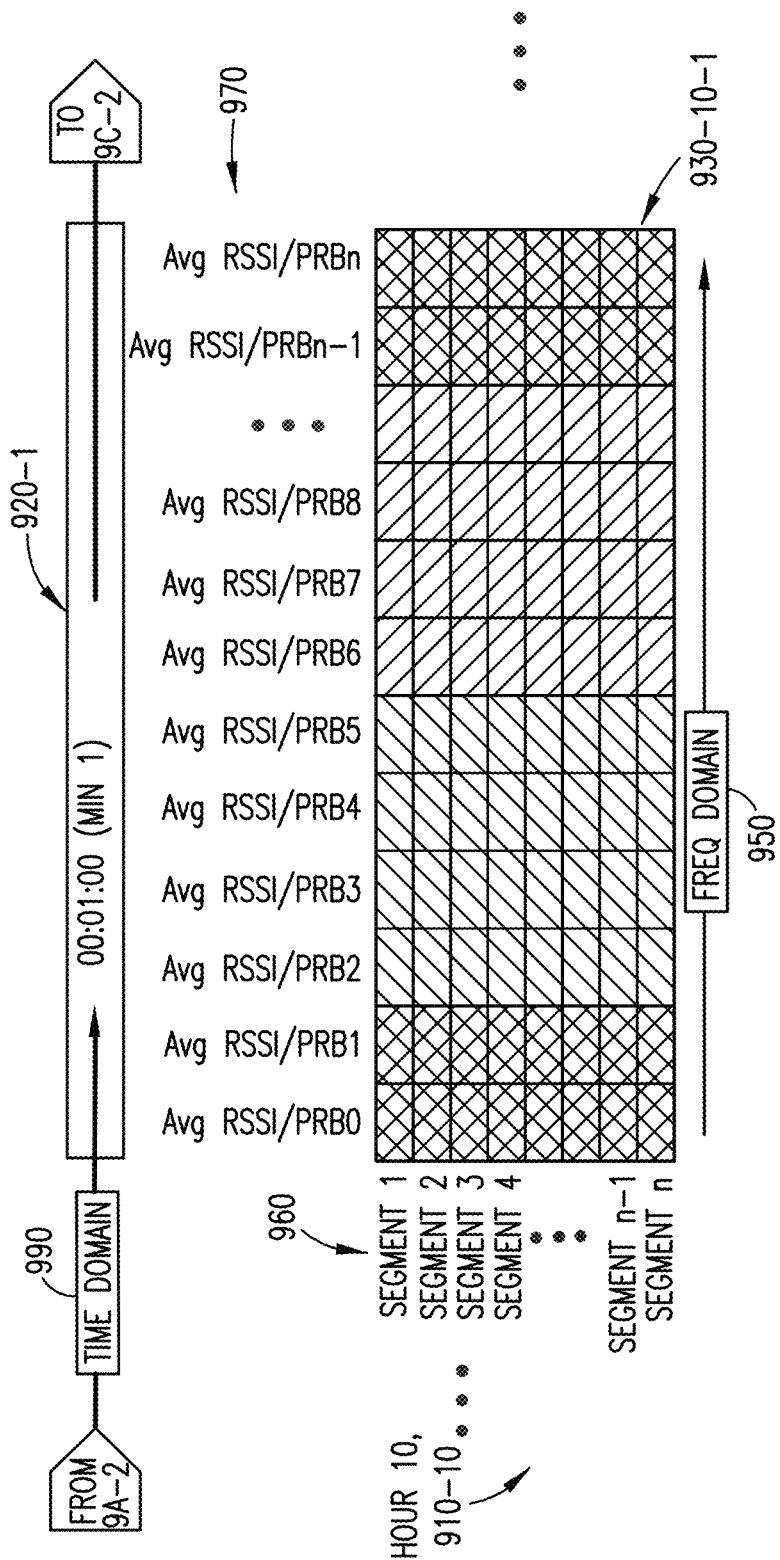
Figures 3, 9B:
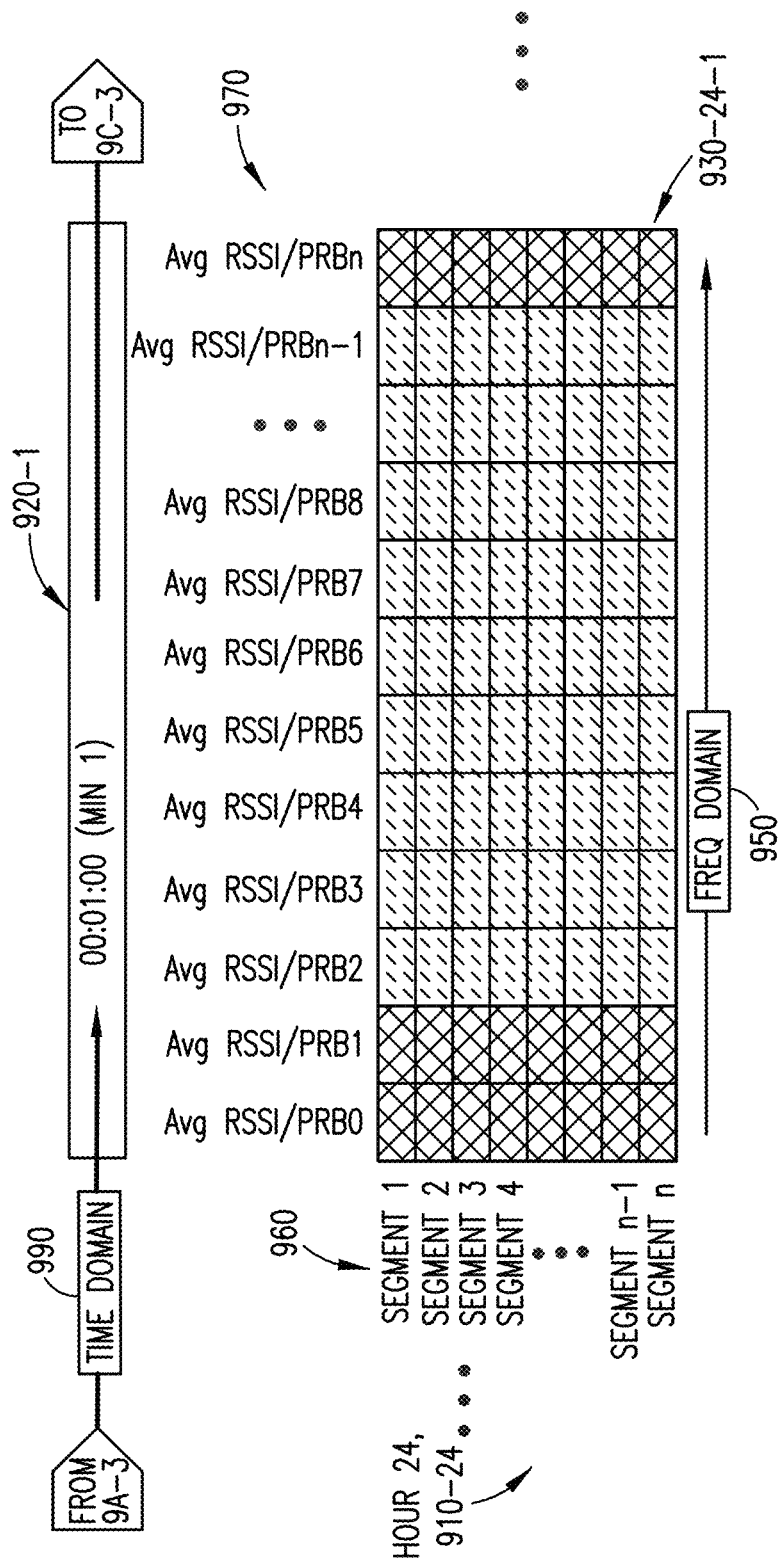
Figures 1, 9C:
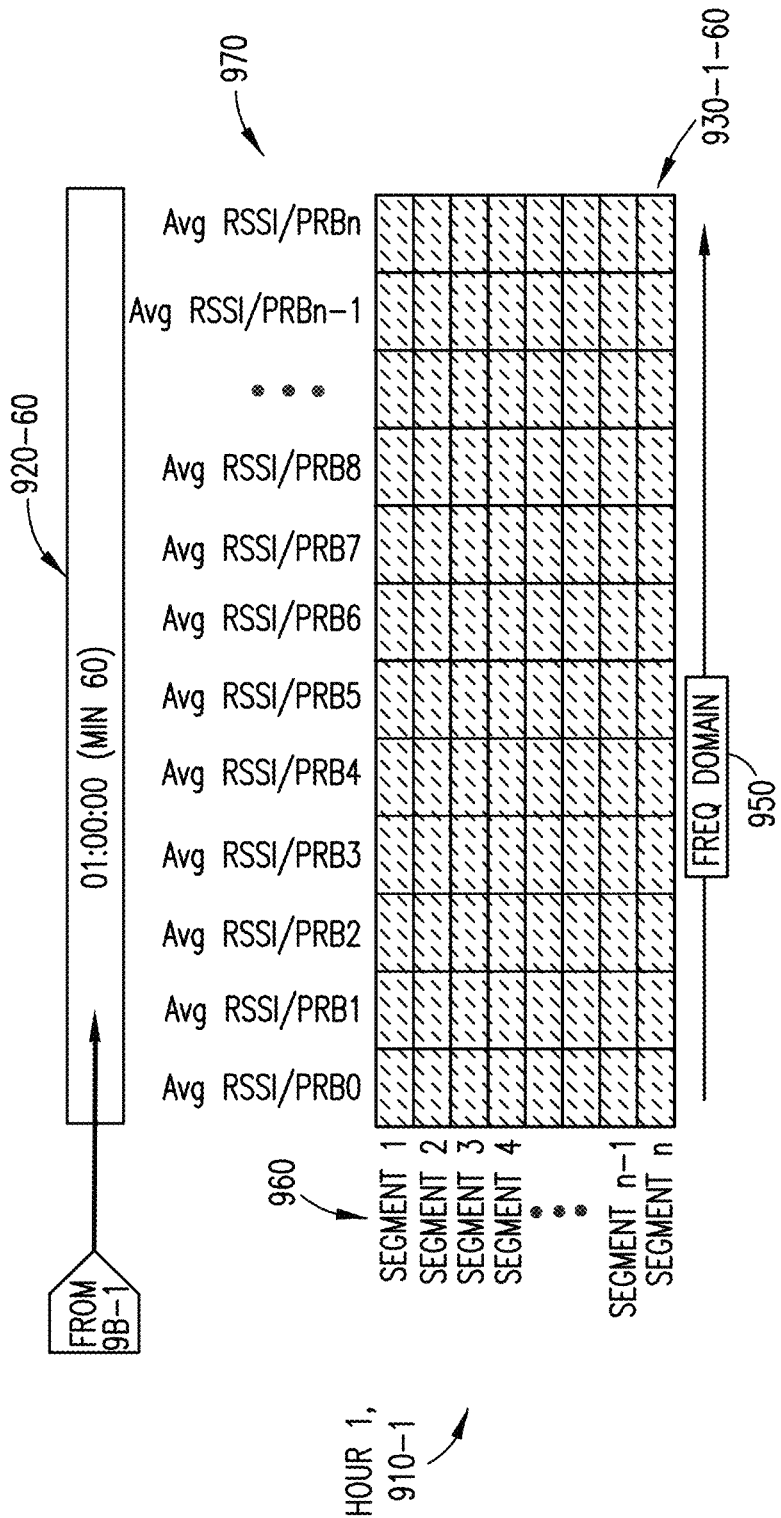
Figures 2, 9C:
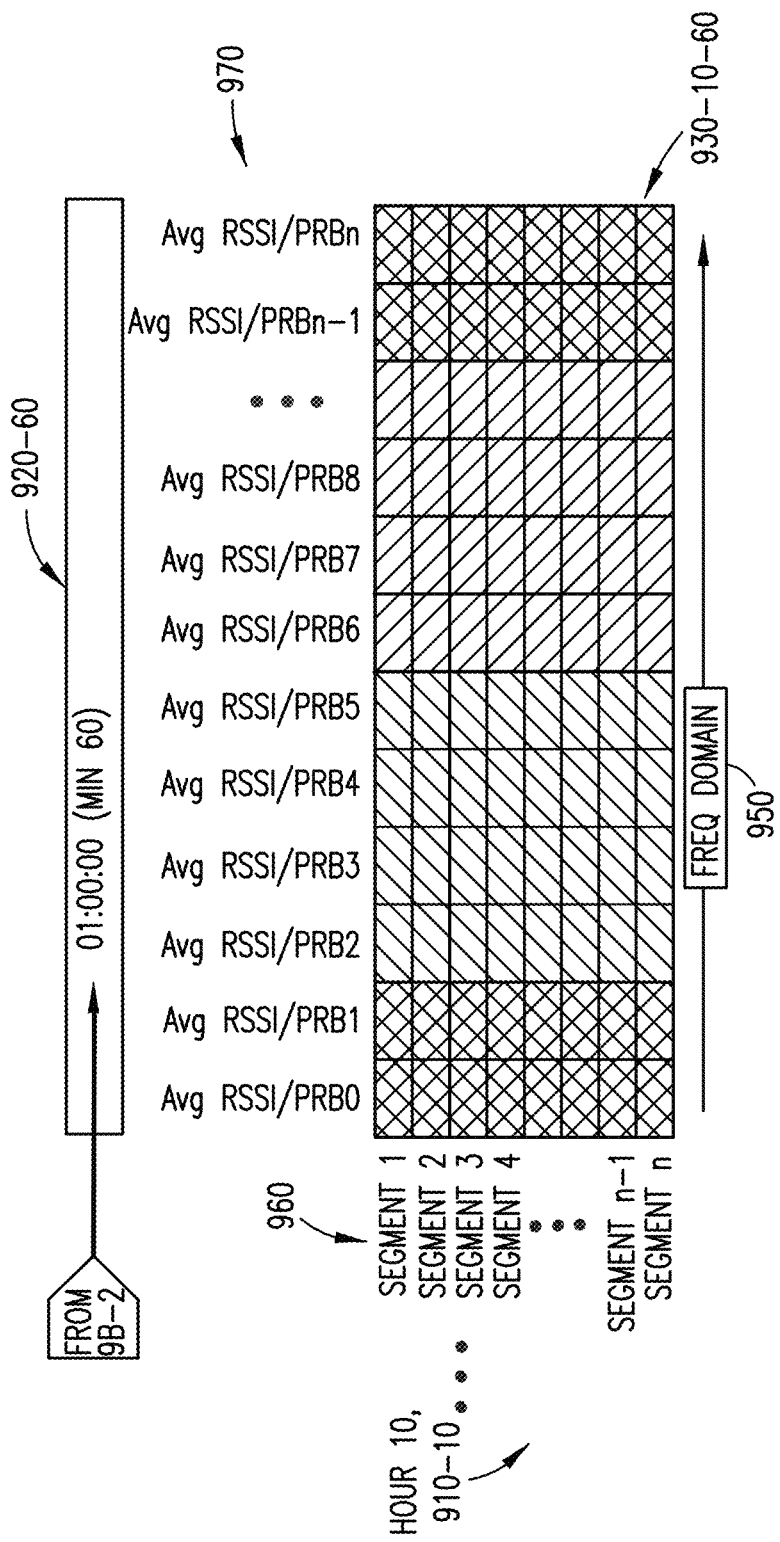
Figures 3, 9C:
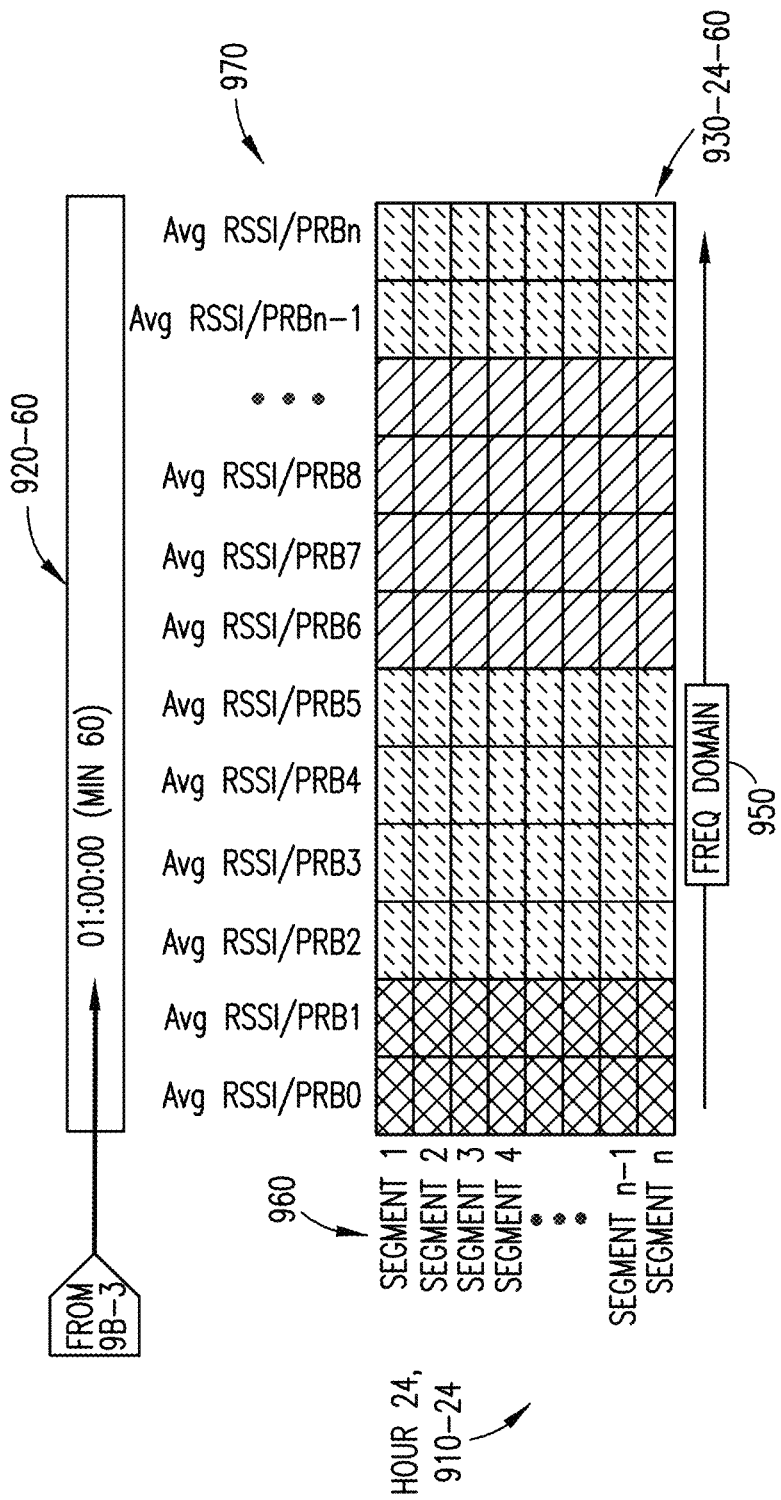

FIG. 9B shows tables 930-1-1, 930-10-1, and 930-24-1, each of these for minute 1 920-1 in the corresponding hour 910. Reference 990 indicates the time domain is being examined, and the next minute is being examined in this example. All 60 minutes in an hour will be examined. FIG. 9C shows tables 930-1-60, 930-10-60 and 930-24-60, each of these for minute 60 920-60 in the corresponding hour 910

Phase 2: State of Interest—In this phase, while there is normal traffic, the interference signatures are injected in a randomized (e.g., different days of week and different times of the day) fashion. See block 825 of FIG. 8. The DCSS algorithm from Phase 1 has a model the baseline measurement profile and will now start capturing abnormal variations in the same measurements, when interference is being randomly injected. The duration of this Phase 2 may be consistent with duration of Phase 1, i.e., two to four weeks. Alternatively, the data samples could be tagged manually as 'with Interferer (State of Interest)' or 'Clean Data (Steady State)' as well based on date, time, and the like, see block 826. As indicated above, this addresses use with machine learning, which uses both known "clean" and "with interferer" data samples.

In this phase as well, the DCSS algorithm in the RIC, upon initiation of this phase may undertake following actions:
1) Relay RF sensing measurement or measurements to be reported by gNB to RIC (see block 830); and
2) Set or modify periodicity of reporting the measurements from gNB to RIC (see block 835).

Figures 2, 10A:
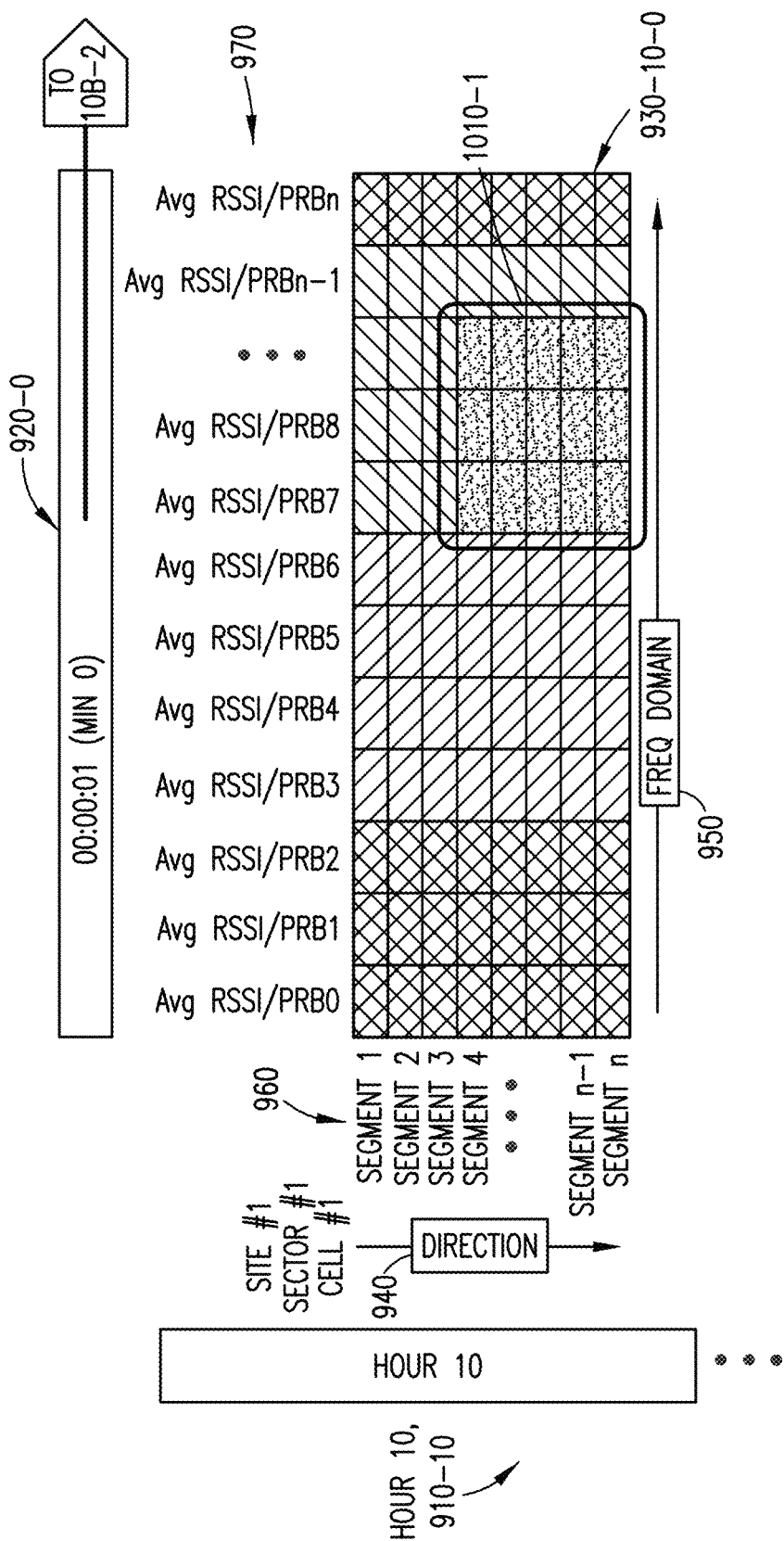
FIGS. 10A, 10B, and 10C illustrate state of interest RSSI/PRB reporting in Phase 2 between cells and RIC over an E2 Interface.
Figures 3, 10A:
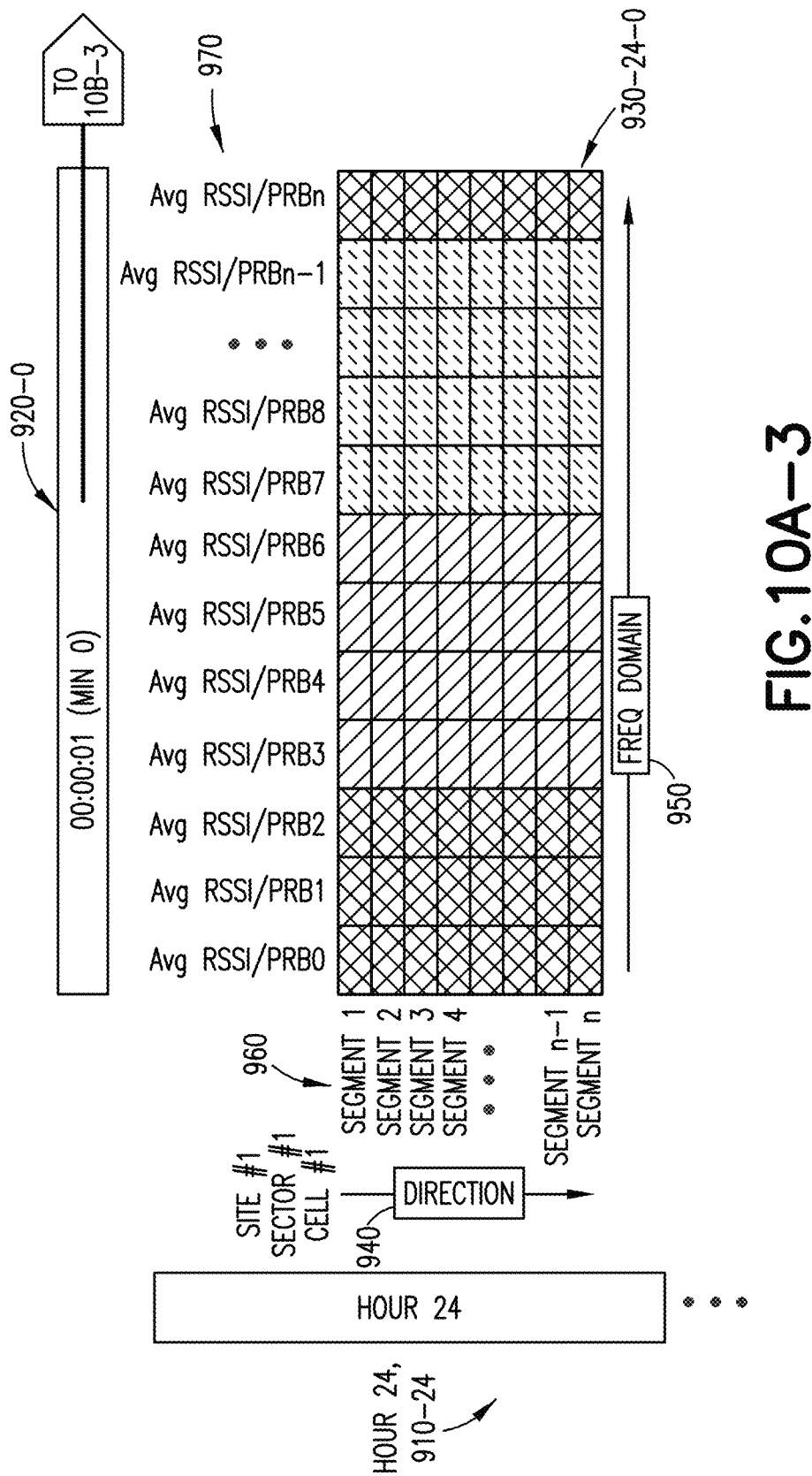
Figures 1, 10B:
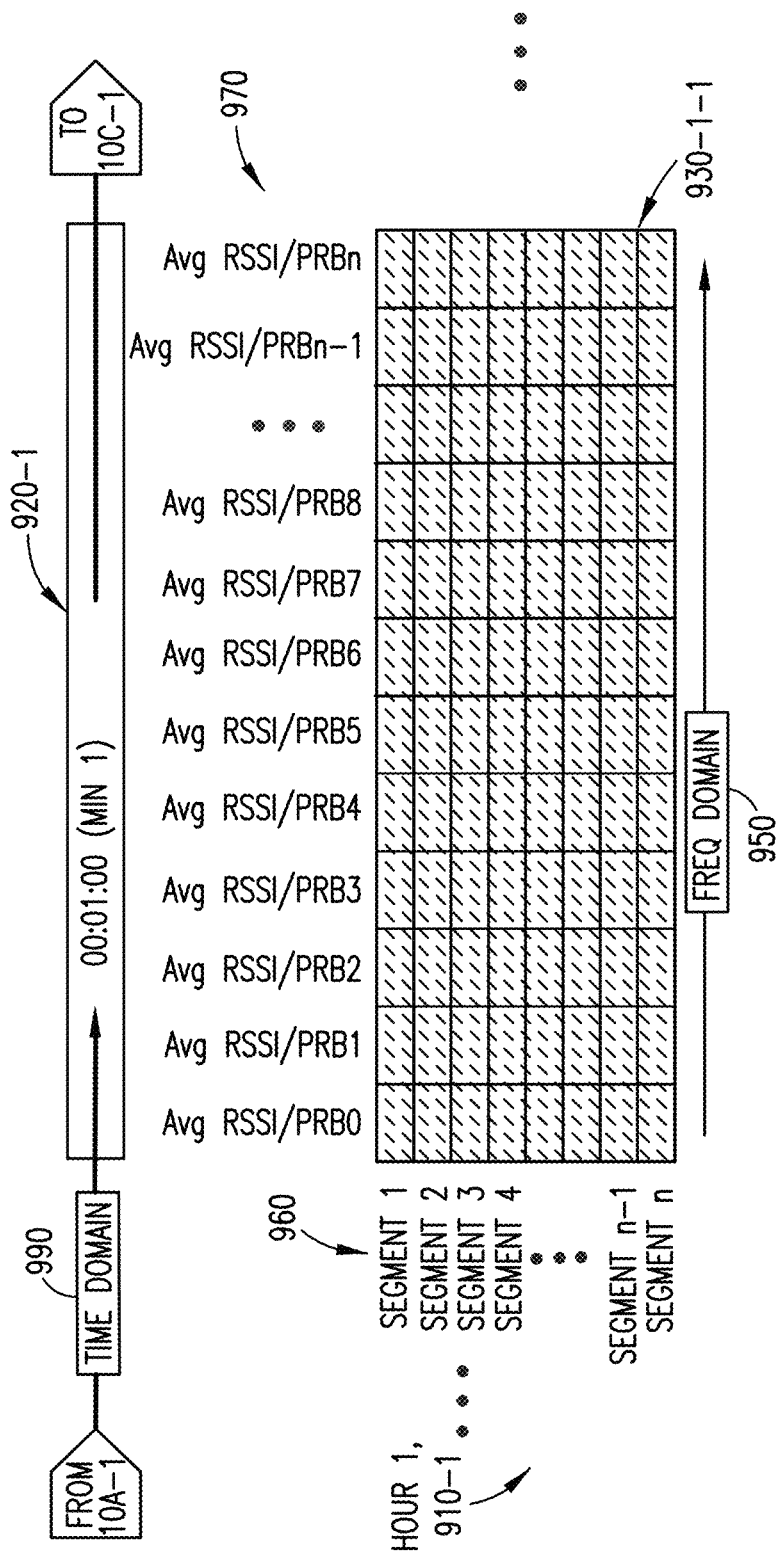
Figures 2, 10B:
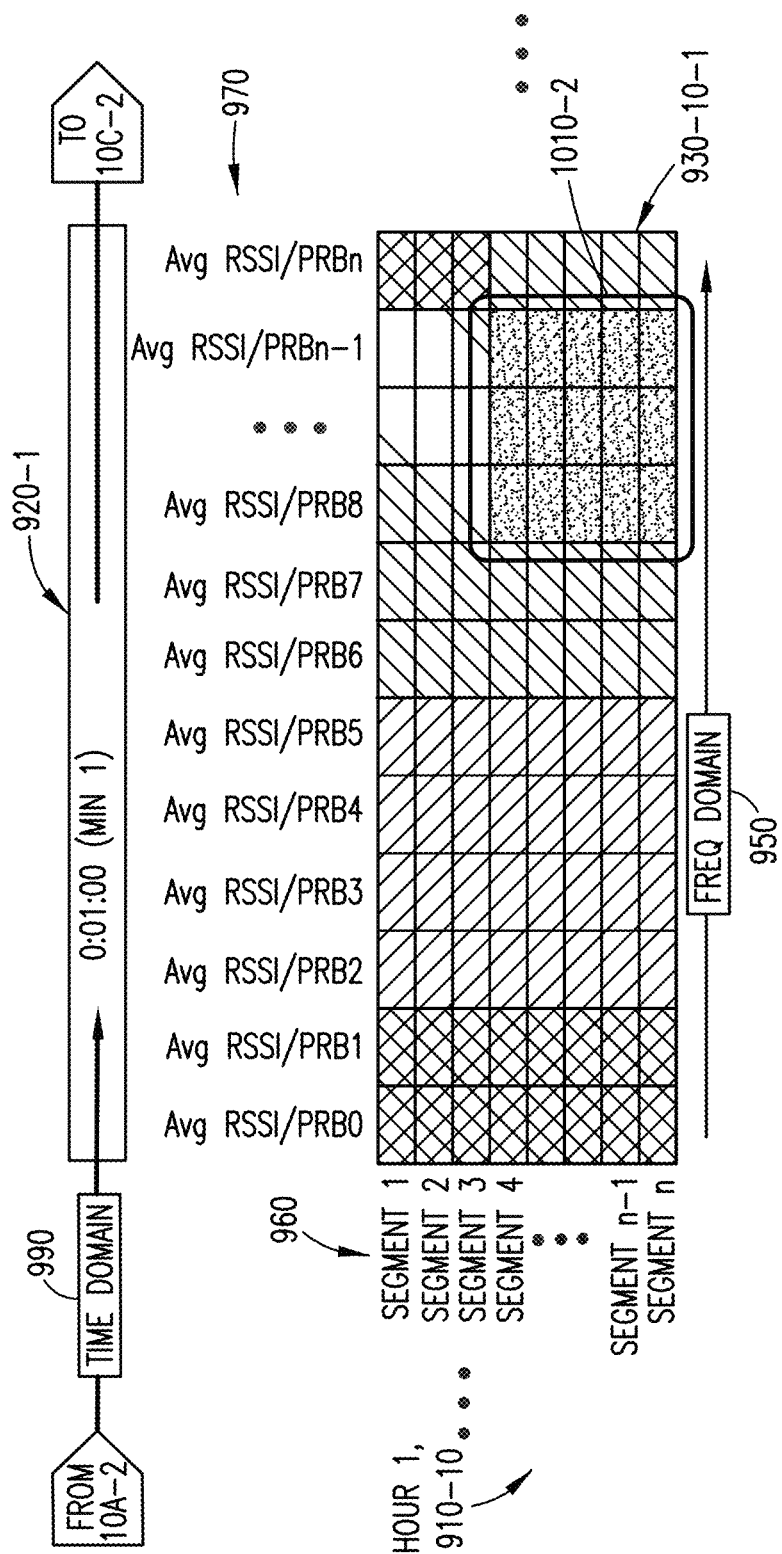
Figures 3, 10B:
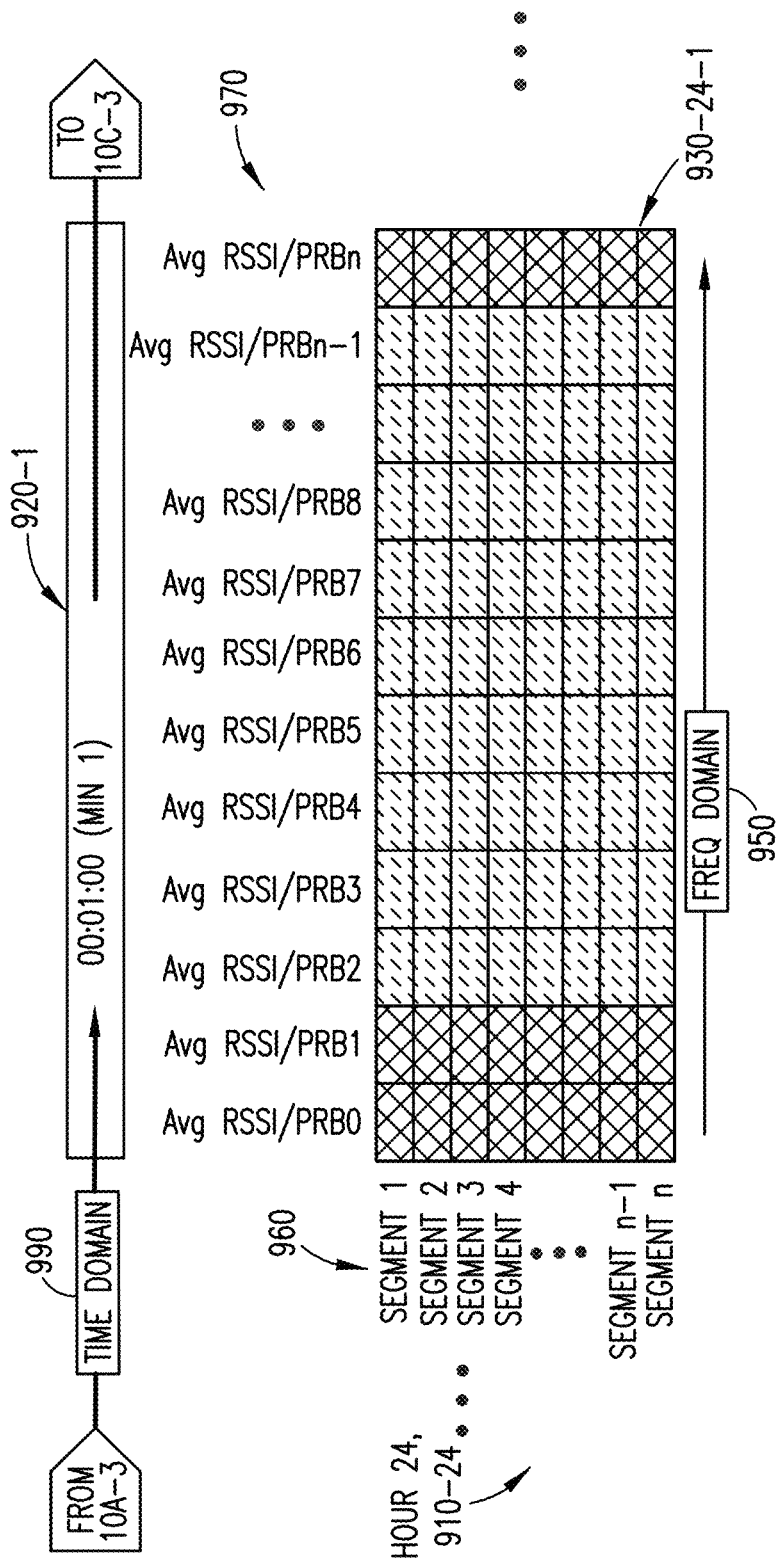
Figures 1, 10C:
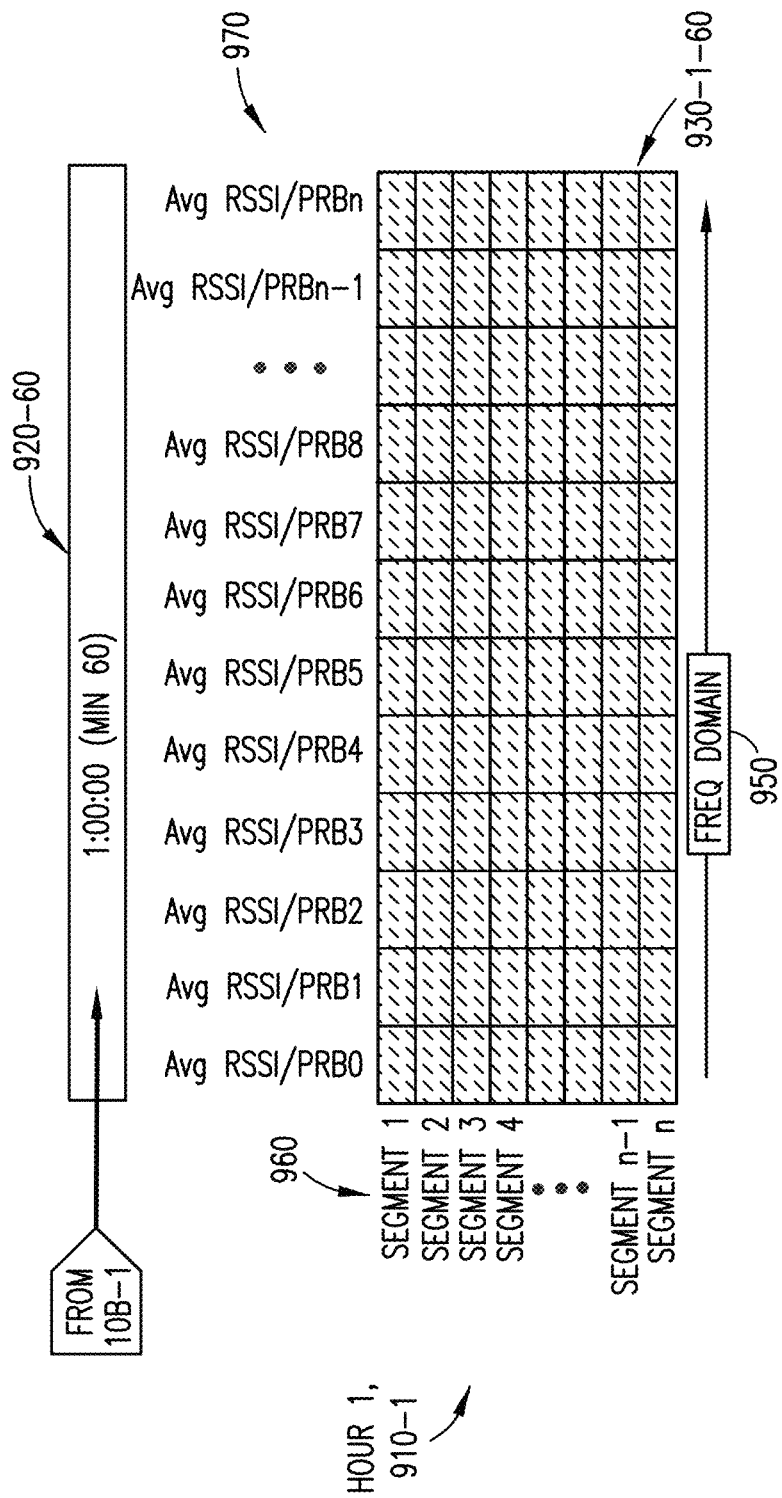
Figures 2, 10C:
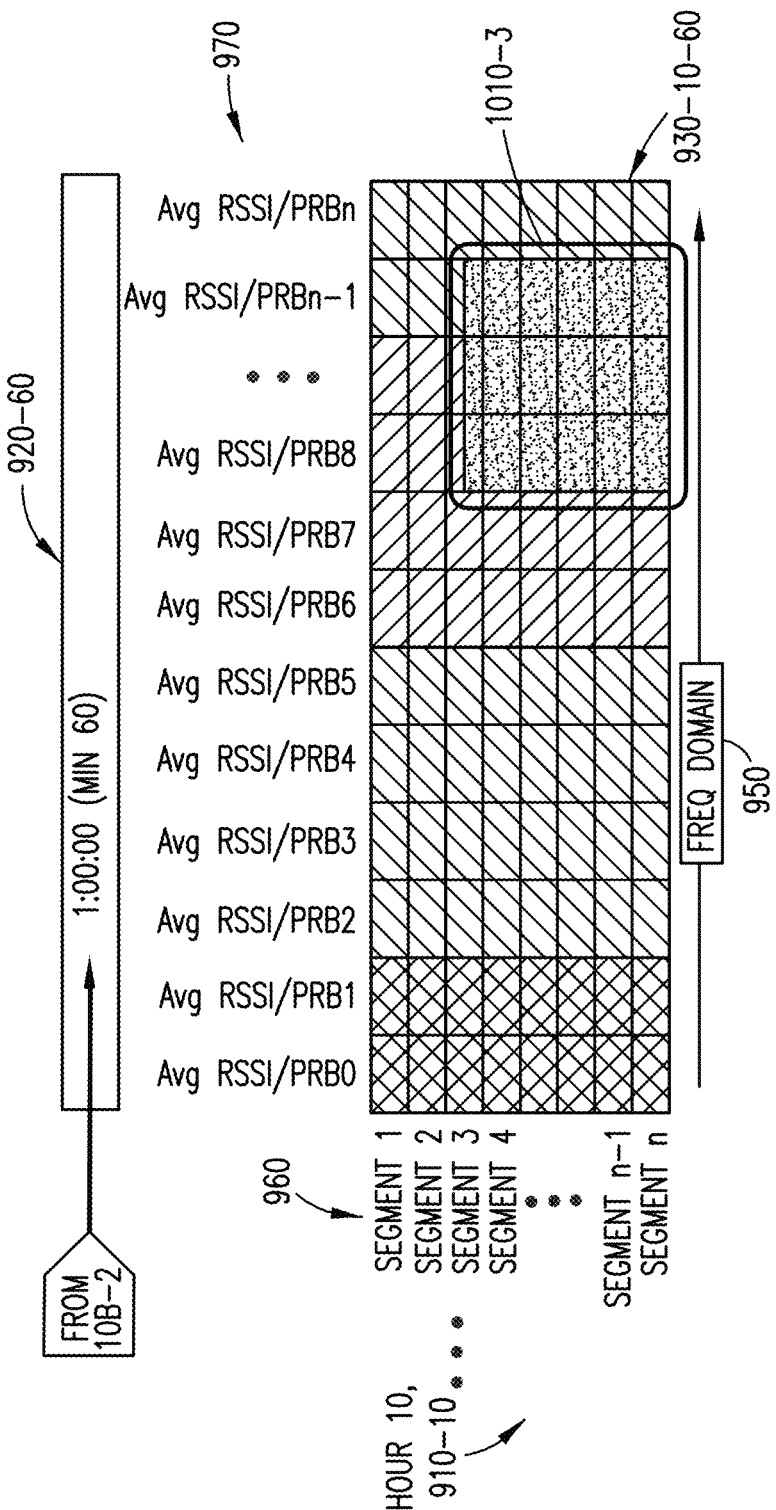
Figures 3, 10C:
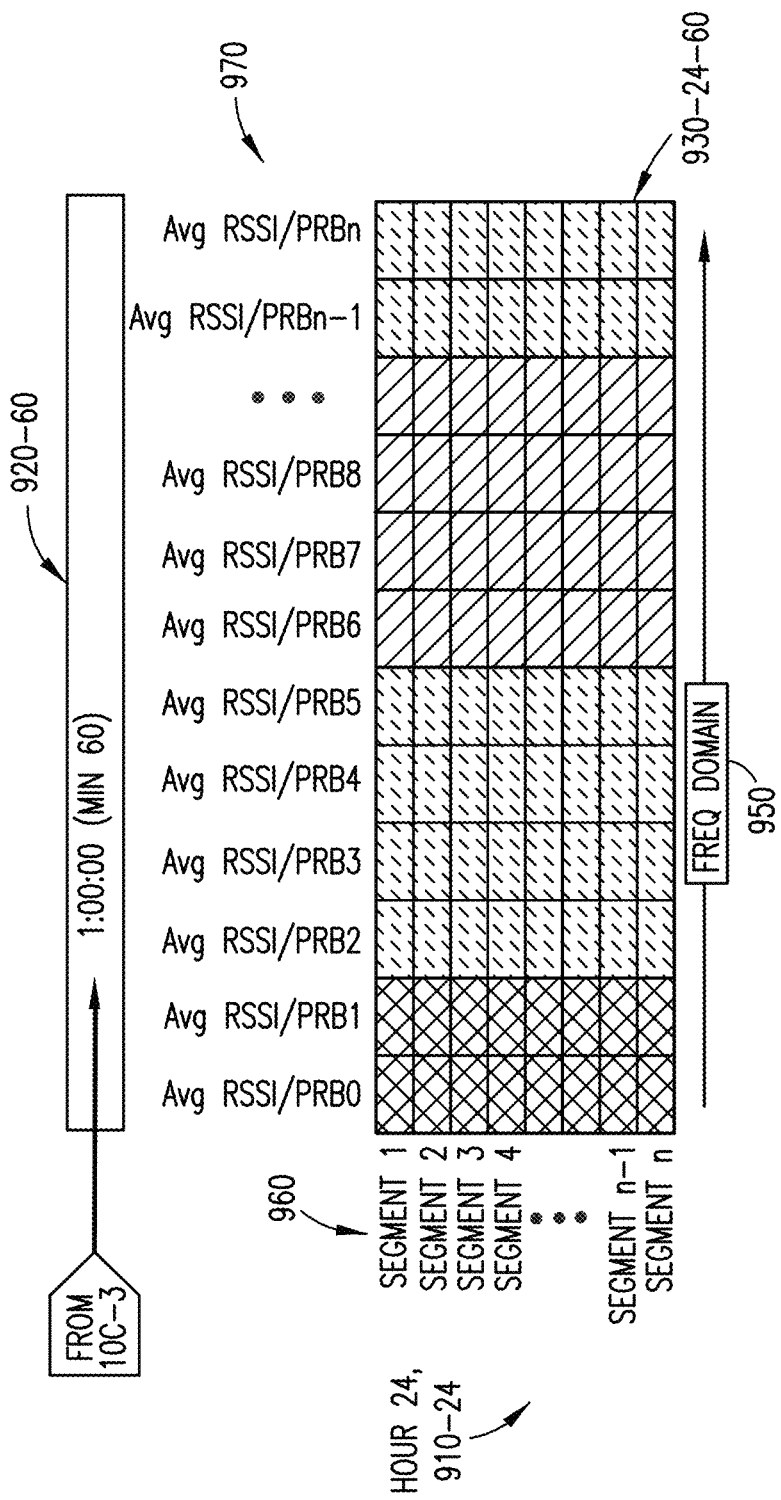

As in Phase 1, the RIC in Phase 2 will request gNBs to report RSSI/PRB report for each beam employed, e.g., with a one-minute periodicity. Every time beams are employed at a gNB, the RSSI/PRB measurements are reported via E2 interface to RIC and the RIC maps (e.g., based on the mapping table shown in FIG. 6) the measurements to corresponding segments (see block 838) as depicted in FIGS. 10A, 10B, and 10C, which include FIG. 10A (corresponding to FIG. 9A), FIG. 10B (corresponding to FIG. 9B), and FIG. 10C (corresponding to FIG. 9C). It is noted that, for data consistency, the RF sensing measurement and periodicity should be consistent between Phases 1 and 2.

In FIG. 10A, as compared with FIG. 9A, there is at least one region 1010-1 (e.g., segments 4 to n and frequency domain spectra 7 to n−2) in hour 10 910-10 of having higher values of interference, and therefore an interferer in that region. Similarly, in FIG. 10B as compared to FIG. 9B, there is at least one region 1010-2 (e.g., segments 4 to n and frequency domain spectra 7 to n−1) in hour 10 910-10 of having higher values of interference, and therefore an interferer in that region. Similarly, in FIG. 10C as compared to FIG. 9C, there is at least one region 1010-3 (e.g., segments 4 to n and frequency domain spectra 7 to n−1) in hour 10 910-10 of having higher values of interference, and therefore an interferer in that region.

Phase 3: Data Correlation and Identification of Anomaly Detection metrics—In this phase, the DCSS algorithm in RIC will perform data correlation analysis by comparing steady state data versus state of interest data, e.g., using the segment indexes. See block 840 of FIG. 8. Based on the correlation analysis, the DCSS algorithm will identify key metrics such as one or more of the following:
1) Standard deviation in RF sensing metric;
2) Spatial localization of interferer signal (e.g., interferer captured on specific segments);
3) Frequency domain localization of interferer (e.g., interference captured in specific PRBs); and/or
4) Rate of arrival of interferer signal (e.g., interferer could cause interference to be periodic in nature).

Using RSSI/PRB as the RF sensing metric (as one example of such), it is illustrated in this document how the DCSS algorithm in RIC performs correlation analysis and determines the anomaly detection metrics.

Figures 11, 11A:
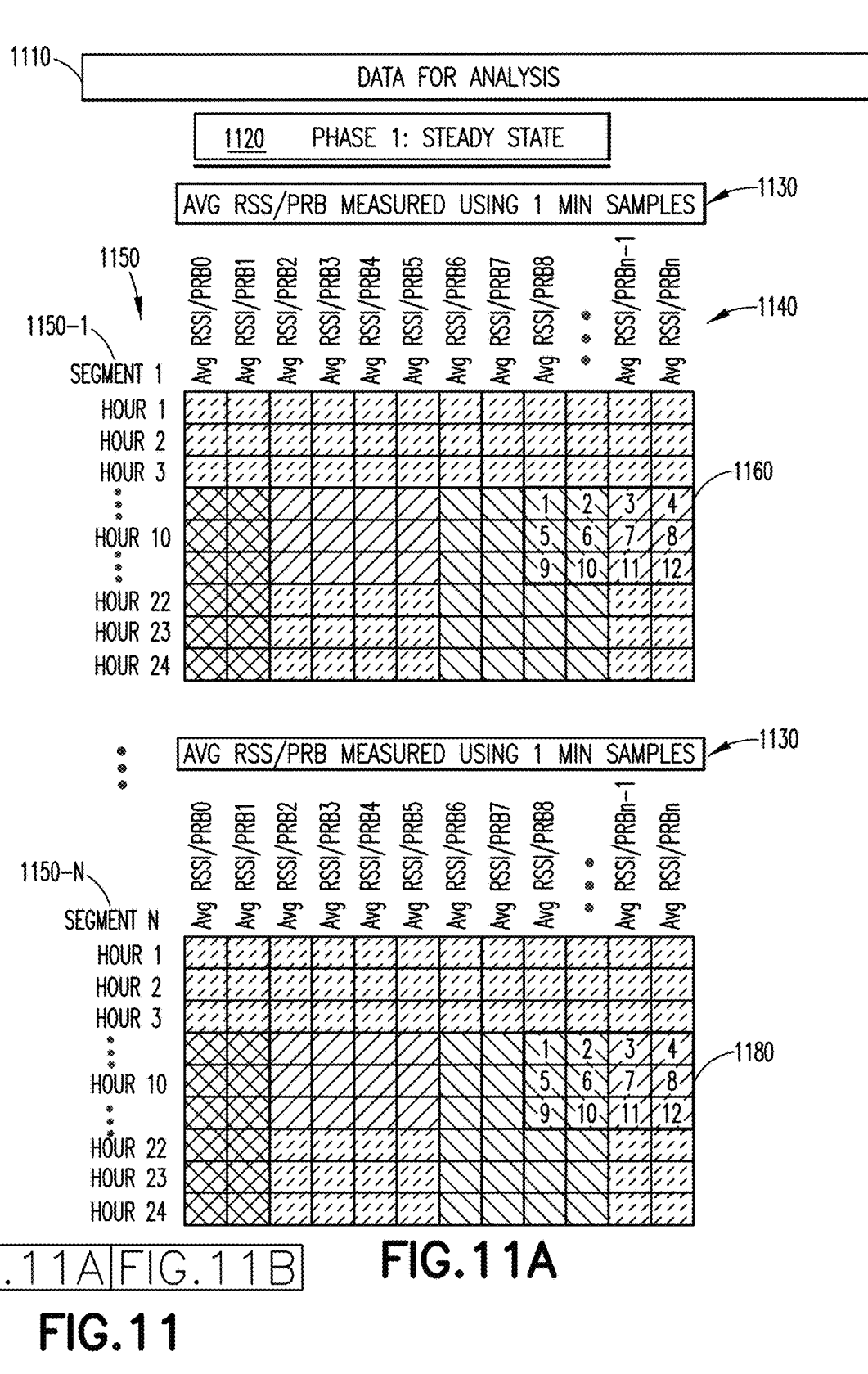
FIG. 11 illustrates how the DCSS algorithm in RIC compares data from Phase 1: Steady State and Phase 2: State of Interest.
Figure 11B:
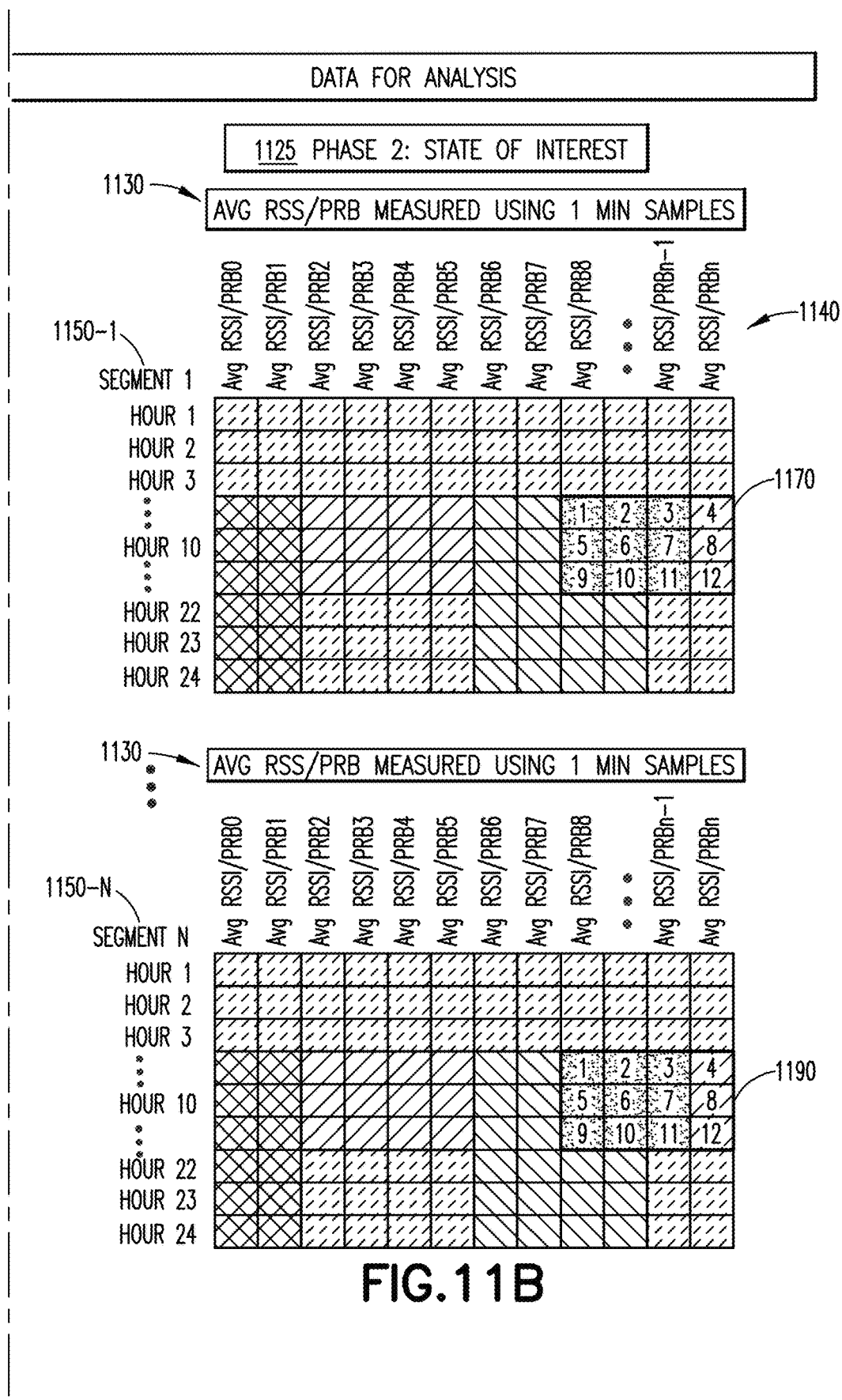

FIG. 11 illustrates how the DCSS algorithm in RIC compares data from Phase 1: Steady State and Phase 2: State of Interest. The DCSS algorithm stores averaged RSSI/PRB measurements per hour (e.g., 24 hours, or one day in this example) for every segment defined by the RIC.

This example shows data for analysis 1110, divided into that data 1120 from Phase 1: Steady State, and data 1125 from Phase 2: State of Interest. Each of these has N segments 1150, which are days and comprise 24 hours. For each day, there are n average (avg) RSSI/PRBs 1140, which is used as an example although other RF sensing metrics may be used. These have been determined (see block 1130) via an average (avg) RSSI/PRB measurement using one-minute sample periodicity. That is, there are 60 values of RSSI per PRB, then you average the 60 values. Selected are two sections 1160 and 1170 for Segment 1 1150-1. Section 1160 has references 1-4 in, e.g., hour 9, 5-8 in hour 10, and 9-12 in, e.g., hour 11. In comparison between the data 1120 and 1125, the data 1125 in section 1170 and references 1, 2, 3, 5, 6, 7, 9, 10, and 11 are indicated as having a higher than normal (e.g., higher than a metric) interference level in the data 1120 from Phase 1 and these hours and corresponding interference levels of section 1160. Similarly, for Segment N 1150-N, section 1180 has references 1-4 in, e.g., hour 9, 5-8 in hour 10, and 9-12 in, e.g., hour 11. In comparison between the data 1120 and 1125, the data 1125 in Section 1190 and references 1, 2, 3, 5, 6, 7, 9, 10, and 11 are indicated as having a higher than normal (e.g., higher than a metric) interference level in the data 1120 from Phase 1 and these hours and corresponding interference levels of section 1180.

Data collected and structured in a format depicted in FIG. 11 allows correlating the RSSI/PRB metric between Phase1: Steady State and Phase2: State of Interest to derive anomaly detection metrics such as the following.

One is Avg RSSI/PRB deviation ($\sigma$RSSI/PRB) in presence of an interferer. Optionally, the standard deviation metric ($\sigma$RSSI/PRB) could be determined per segment as well.

Figure 12:
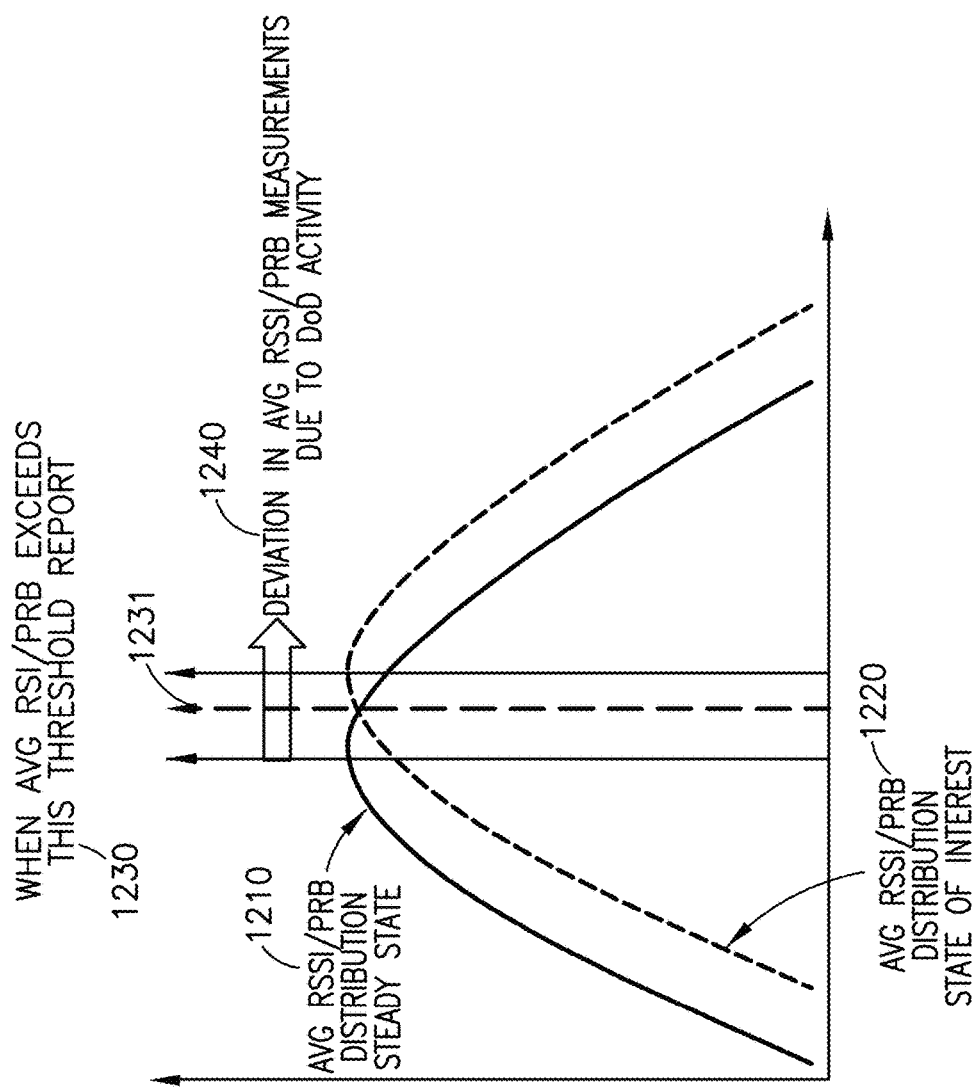
FIG. 12 illustrates plots of average RSSI/PRB samples from Phase 1 and Phase 2 and how these may be correlated and used to determine a threshold.

A second is correlation of data at a segment level, which helps to gauge directional nature of the interferer. Turn to FIG. 12, which illustrates plots of average RSSI/PRB samples from Phase 1 (Steady State) 1210 and Phase 2 (State of Interest) 1220 and how these may be correlated and used to determine a threshold. This illustrates a threshold to detect an SOI, using a threshold 1231. As indicated by reference 1230, when average (avg) RSSI/PRB exceeds threshold 12301, then a report is made. Reference 1240 indicates that the deviation in average RSSI/PRB measurements are due to DoD (or other interferer) activity. Applying this to a segment of space indicates that this segment has an interferer when the threshold is exceeded.

Figure 13:
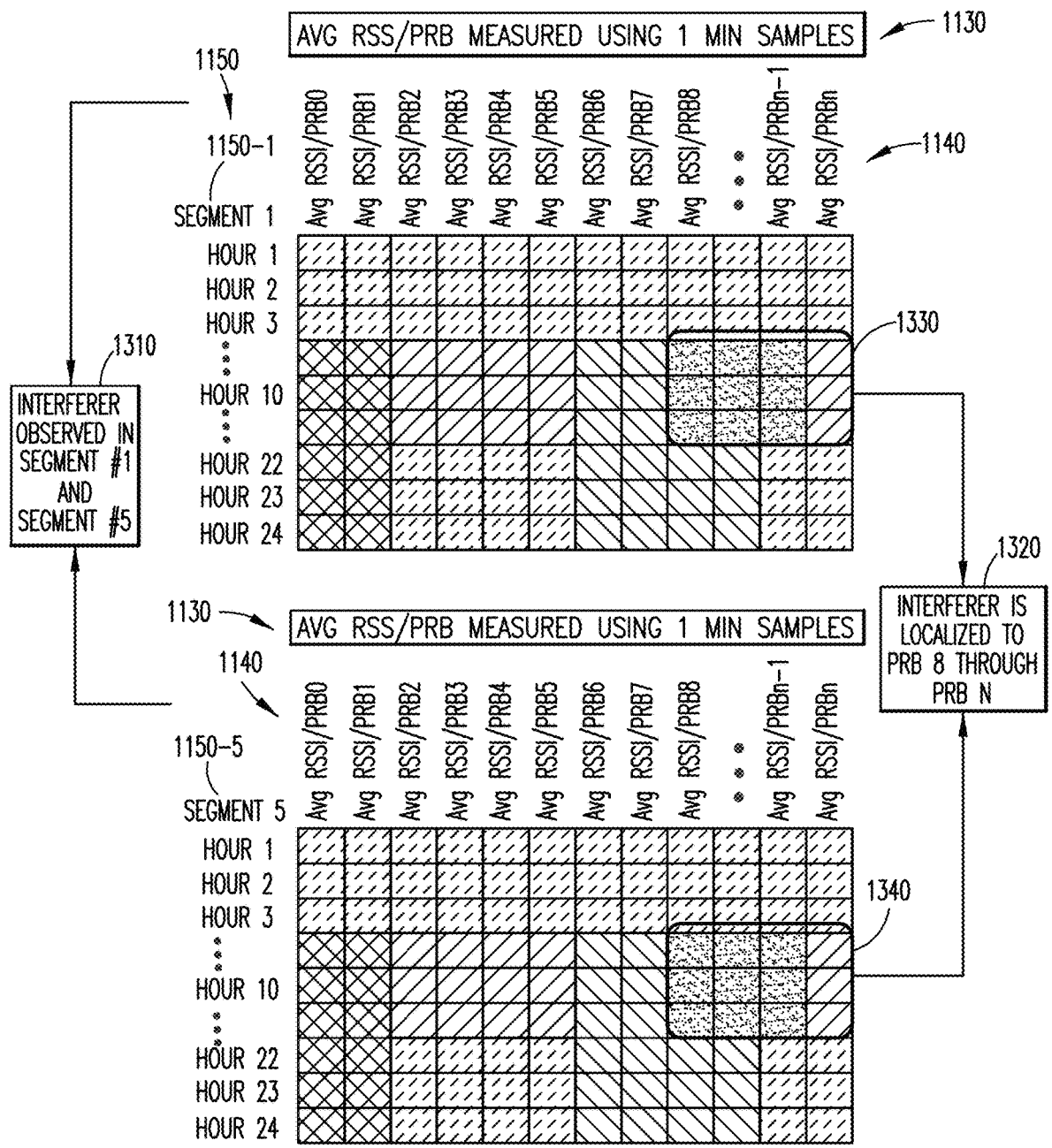
FIG. 13 illustrates how correlation analysis may be used to detect a directional nature of an interferer.

A third is correlation of data in the frequency domain help to gauge if the interferer manifests only on specific parts of the spectrum. Refer to FIG. 13, illustrates how correlation analysis may be used to detect a directional nature of an interferer. FIG. 13 is similar to FIG. 11, but shows two segments 1150-1 and 1150-5. The darker shades are indicating presence of an interferer. The shades represent a "heat map" of the received signal. Lighter shades represent lower magnitude of signal strengths while darker shades represent higher magnitude of signal strength (indicating possible presence of interferer). As indicated by block 1310, the interferer is observed in segments #1 and #5. Block 1320 indicates that the interferer is localized to PRB8 through PRBN in RF sensing metric (Avg RSSI/PRBs 1140) and hours 9 to 11. See region 1330 in segment 1 1150-1 and region 1340 in segment 5 1150-5.

A fourth is analysis of data collected during Phase 2 at, e.g., a one-minute (min) sampling rate can also indicate the if the interferer occurred in periodic intervals and if the interferer was moving at a rapid velocity (e.g., above a threshold velocity).

C. Step III. Co-Channel Interferer Presence Detection and Autonomous Mitigation This section will cover details on the actions the RIC and gNB will perform after the co-channel interference signal is detected in a live system. That is, in a live system, there are use case scenarios where the detection of the co-channel interferer and mitigation steps need to be executed within five seconds. Certain use-case scenarios for DoD were described in the Background section, though the exemplary embodiments can apply to any interference. Regarding mitigation within five seconds, this implies that the co-channel interference sensing will need to be performed at a much higher periodicity than the one-minute interval used in Phases 1 and 2. However, increasing the reporting periodicity can result in very high throughput demand on the E2 interface. To overcome this, exemplary embodiments propose an event-based periodic reporting capability. The event is defined as a situation where the average RSSI/PRB (or other RF sensing metric) measured exceeds GRSSI/PRB. Exceeding this threshold signifies that a substantial change has been detected in the RSSI/PRB (or other RF sensing metric) "heat map", which indicates the presence of the interferer.

When this threshold is exceeded, the gNB 170 will start reporting RSSI/PRB at a symbol level. This is described in FIG. 14 as an event-based reporting step. Referring to FIG. 14, this figure illustrates a summary of main phases during detection and mitigation step. The main phases are the event-based reporting phase 1430, the DCSS analysis phase 1450, and the mitigation phase 1465. As indicated by reference 1410, an event detection threshold is installed by the RIC. The event is detected (e.g., one or more measurements are greater than the event detection threshold) at reference 1420. In response, in the event-based reporting phase 1430, the gNB 170 performs symbol-level reporting 1435 to the RIC. This occurs in this example for one second.

After the one second period, the DCSS analysis phase is performed for two seconds. In block 1460, the DCSS makes a decision to initiate mitigation. If it is not time (block 1460=No), path 1470 is followed and the phases do not start again until another event is detected. If it is time to initiate mitigation (block 1460=Yes), the path 1475 is taken and the mitigation phase 1465 is performed for two seconds in this example.

The RIC will start processing the RSSI/PRB information to check for other anomaly signatures such as spatial localization, frequency domain localization, and rate of arrival (velocity of interferer) of interferer signal as described in Phase 3.

If the DCSS algorithm in the RIC, upon detection of adequate measurements, determines no further reporting is required, the RIC will initiate (reference 1446) a stop report request to the gNB. See also reference 1445, where reporting stops and DCSS starts the analysis phase.

The DCSS algorithm checks (reference 1480) to see whether the measurements collected show correlation with other anomaly signatures such as spatial localization, frequency domain localization and rate of arrival (e.g., velocity) of the interferer signal. If a correlation with more than one anomaly signature is detected (block 1490), the presence of an interferer is confirmed and the DCSS algorithm moves (path 1475) to mitigation phase 1465 described in FIG. 14. In further detail, detection is based on evidence. Some of the characteristics of DoD (or other) interference may appear during normal operation. Typically, one would expect more than one "anomaly signature" when DoD interference is present. Further, it is noted that deviation (in radio measurements from Steady State) may be one anomaly signature and a section of bandwidth (in a segment) may be a second signature, which is why more than one anomaly signature is used. Additional deviation could include mobility (i.e., movement of an interferer), e.g., indicated via parts of the system as part of an anomaly signature. However, if no correlation with anomaly signature is observed, then no action is taken and DCSS algorithm will wait (path 1470) for the next event reported by the gNB.

Depending on the anomaly metric detected, one or more of the following mitigation options can be enforced.

Mitigation option 1: PRB blanking;

Mitigation option 2: SSB muting or beam set blacklisting; and/or

Mitigation option 3: Traffic steering of commercial users to other operator layers, such as multiple channels or other spectra.

In the example of FIG. 16, these mitigation option(s) are implemented within two seconds in the mitigation phase 1465.

Figure 15:
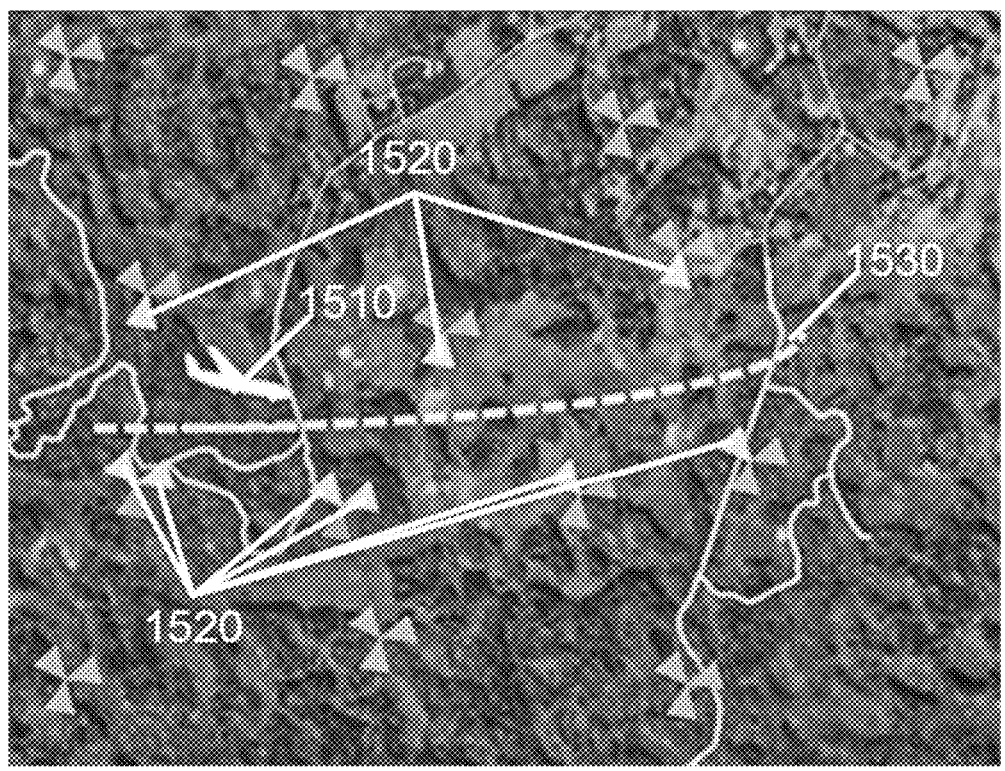
FIG. 15 illustrates a map with sites of interest being monitored by RIC.

As mentioned earlier, the profiling and training described in Step II will be performed on a cluster of sites where DoD activity is expected. The mitigation options, described above in Step III, will only be implemented on a specific set of sectors that fall along the trajectory where co-channel interference is detected. An example of this is depicted in FIG. 15, which illustrates a map with sites of interest being monitored by RIC. In this example, a plane 1510 will fly along the trajectory 1530. The sites of interest are cells 1520, each one being a single cell of a multicell tower and controlled by a corresponding gNB 170.

The mitigation options will be implemented for a predetermined amount of time (e.g., one hour) after which the system will move to Step IV—Return to normal operation.

D. Step IV. Return to Normal Operation

The purpose of this step is to restore to a normal operation from the randomized state of interest in which DCSS executed the mitigation action to manage the spectrum while the interference signal (the RSSI/PRB measured exceeds GRSSI/PRB) is present. It is beneficial if the normal operation is restored at the earliest opportunity to free up the resources (blanked PRB and muted beams) for normal traffic usage.

In this step, the RIC can start a timer as soon as a mitigation action is triggered based on Step 3. The timer is a configurable parameter, the value of the timer can be set based on the learning and profiling in Step 2. Upon timer expiry, the RIC will re-install the event based periodic reporting threshold to the gNB. FIG. 16 depicts the overall flow for this step. FIG. 16 illustrates a summary of return to normal operation flow, which extends the summary of FIG. 14. This example has the mitigation timer active as per reference 1610, for two hours, then path 1620 is followed to step 1410, where another event detection threshold is installed or the previously installed event detection threshold is used until an event is detected in reference 1420. That is, this example as a total of 5 seconds to detect interferer and take mitigation steps. Upon enforcement of a mitigation step, a mitigation timer is started and mitigation is enforced for this duration (two hours in this example, though could be on the order of minutes or hours). The length of the mitigation timer may be configurable by an operator, for instance. Once the mitigation timer expires, the mitigation step enforced will be removed and the system falls back to normal operation and continues monitoring.

In the event of the commercial traffic changes or significant environmental changes there might be a need to repeat Step 1 to Step 3 to update the model and to generate new anomaly detection metrics.

E. Communication Flows Between Near-RT RIC, xAPP and gNB/mMIMO Antenna

Figure 17A:
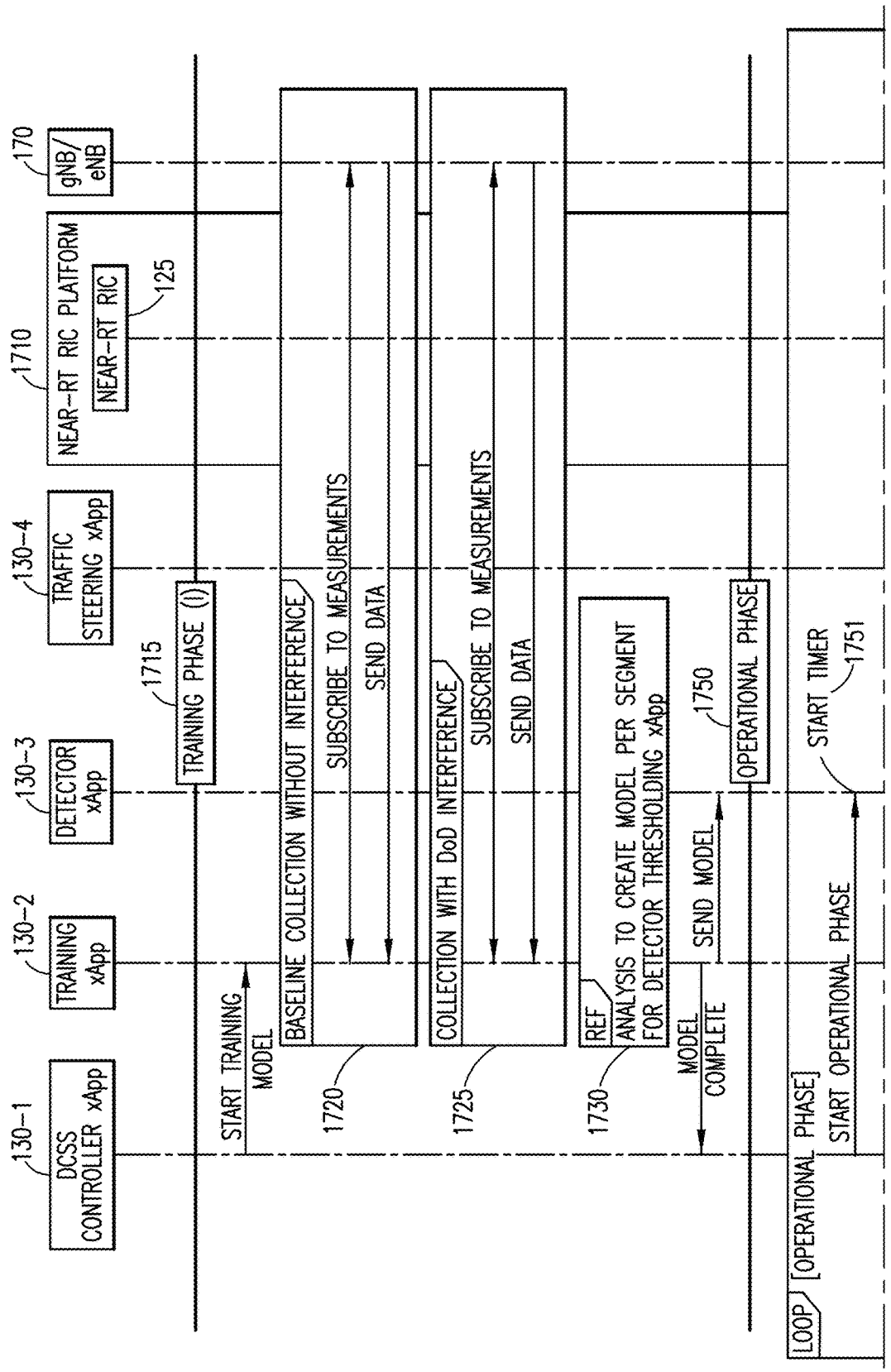
FIG. 17 illustrates communication flow between xAPPs, RAN nodes and near-RT RIC.
Figure 17B:
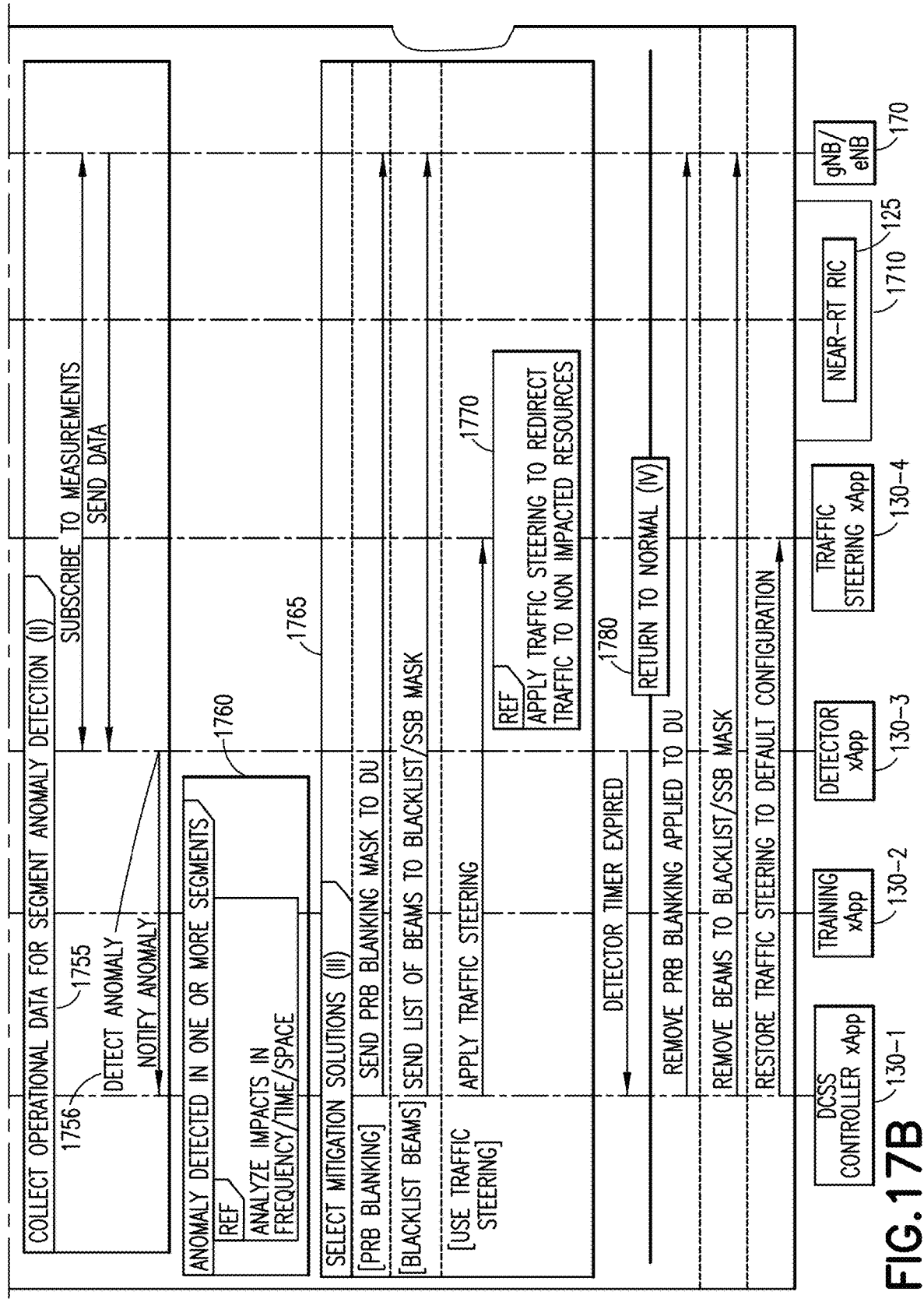

FIG. 17 illustrates communication flow between xApps 130, RAN nodes 170 and near-RT RIC 125. In this example, The Near-RT RIC is implemented on a cloud platform that hosts the xApps. The Near-RT RIC also terminates the standardized interfaces to the RAN (the E2 Nodes). Because the xApps may be provided by a third party, an API is defined for the information exchange between the xApps and the RIC. It should be noted that the Near-RT RIC 125 terminates all E2 interfaces to the gNB 170 or eNB 170 and that the gNB 170 could be disaggregated into CU-CP (central unit-control plane), CU-UP (central unit-user plane), and DU (distributed unit) in which case there are separate instances of the E2 interface to each of those components. All communications between the xApps 130 and the RAN nodes 170 is through the Near-RT RIC 125. This is simplified below for clarity. The near-RT RIC 125 is part of a near-RT RIC platform 1710.

O-RAN use cases are typically implemented using multiple xApps 130. In the implementation in FIG. 17, the DCSS controller xApp 130-1 coordinates the other xApps to realize the exemplary embodiments. The other xApps are a training xApp 130-2, a detector xApp 130-3, and a traffic steering xApp 130-4. Three phases are shown: a training phase 1715 (corresponding to Step I of FIG. 2); an operational phase 1750; and a return to normal phase 1780 (corresponding to Step IV of FIG. 2).

The DCSS controller xApp 130-1 sends a start training model message to the training xApp 130-2. This starts a collection stage.

During the collection stage, data will be received from DUs in multiple gNBs 170. This enables the detector xApp 130-3 to further validate the detection of interference by observing the change in the pattern in space and time.

In reference 1720, there is a baseline collection without interference. The training xApp 130-2 and gNB 170 communicate so the training xApp 130-2 subscribes to measurements. The gNB 170 sends data to the training xApp 130-2. In reference 1725, there is collection with DoD interference. As with reference 1720, the training xApp 130-2 and gNB 170 communicate so the training xApp 130-2 subscribes to measurements, and the gNB 170 sends data to the training xApp 130-2. In reference 1730, the training xApp 130-2 performs an analysis to create a model per segment for the detector (e.g., thresholding) xApp 130. The training xApp 130-2 sends a model complete message to the DCSS controller xApp 130-1, and sends the model that has been created to the detector xApp 130-3.

The next phase is the operational phase 1750, which may be implemented as a large loop. The DCSS controller xApp 130-1 sends a start operational phase message to the detector xApp 130-3, and the detector xApp 130-3 starts a timer in reference 1751. In reference 1755, there is a collect operational data for segment anomaly detection (as in Step II of FIG. 2). The detector xApp 130-3 and the gNB 170 communicate to subscribe the detector xApp 130-3 to measurements from the gNB 170, and the gNB 170 sends data to the detector xApp 130-3. The detector xApp 130-3 sends a notify anomaly message to the DCSS controller xApp 130-1 in response to the detector xApp 130-3 determining an anomaly has been detected (reference 1756).

In reference 1760, an anomaly has been detected in one or more segments and the DCSS controller xApp 130-1 analyzes the impact in frequency and/or time and/or space. In reference 1765, one or more mitigation solutions are selected (as in Step III of FIG. 2). Three exemplary solutions are shown, although not all may be implemented, and others may be used instead. The first is PRB blanking, where the DCSS controller xApp 130-1 sends a PRB blanking mask to the DU that is part of the gNB 170. The second is blacklisting beams, where the DCSS controller xApp 130-1 sends a list of beams to blacklist or sends an SSB mask. The third is to use traffic steering, where the DCSS controller xApp 130-1 sends a message to apply traffic steering to the traffic steering xApp 130-4. As indicated in reference 1770, the traffic steering redirects traffic to non-impacted resources. The operational phase ends when the time started in reference 1751 expires, and the detector xApp 130-3 sends a detector timer expired message to the DCSS controller xApp 130-1.

A return to normal phase 1780 starts (as in Step IV of FIG. 2). The DCSS controller xApp 130-1 sends a message to remove PRB blanking to the DU that is part of the gNB 170. The DCSS controller xApp 130-1 sends a message to the gNB to remove the beams blacklist or SSB mask. The DCSS controller xApp 130-1 sends a message to the traffic steering xApp 130-4 to restore traffic steering to a default configuration.

F. Other Considerations

The following are additional examples.

Example 1. A method, comprising: detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer; and performing, by the controller of the radio access network, mitigation of interference in the one or more segments.

Example 2. The method of example 1, wherein the performing mitigation of interference in the one or more segments comprises performing one or more of the following: causing PRB blanking of one or more beams able to serve the one or more segments; causing SSB muting or beam set blacklisting; or causing traffic steering of users using the one or more segments from a current operator layer to another operator layer.

Example 3. The method according to example 1 or 2, wherein the detecting the interferer is present in the region comprises detecting the interferer is present in the region because the one or more segments have an anomaly signature having at least deviation in radio measurements from steady state values in a section of bandwidth in corresponding segment.

Example 4. The method according to any one of examples 1 to 2, wherein: the method further comprises receiving, by the controller of the radio access network, multiple symbol-level radio measurement reports from a base station collecting the multiple symbol-level radio measurement reports in the region covered by the one or more antenna arrays; the detecting the interferer is present further comprises comparing the received multiple symbol-level radio measurement reports with anomaly signatures corresponding to the segments of the cell to determine the one or more segments.

Example 5. The method according to example 4, wherein the multiple symbol-level radio measurement reports are performed over a single second.

Example 6. The method according to one of examples 4 or 5, further comprising installing, by the controller of the radio access network, an event detection threshold in the base station to be used to cause the base station to make radio measurements for corresponding multiple symbol-level radio measurement reports in response to the event detection threshold being met by a measurement taken by the base station.

Example 7. The method according to one of examples 4 to 6, further comprising making by the controller a decision to apply a particular mitigation based at least on the detecting, wherein the performing mitigation performs mitigation using the particular mitigation, and wherein the particular mitigation is performed for a time period, and then is halted at least until another interferer is detected.

Example 8. The method according to example 7, wherein a time period from the detecting to the making the decision is performed within seconds, whereas the time period when the particular mitigation is performed encompasses minutes or hours.

Example 9. The method according to any one of examples 1 to 8, wherein the controller of a radio access network of a wireless network comprises a near-real-time radio access network intelligent controller.

Example 10. A method, comprising: determining, at a base station controlling one or more antenna arrays that provide a three-dimensional view of segments of a cell in a wireless network, that an event has been detected because one or more radio measurements of the segments of the cell meet an event detection threshold; performing by the base station multiple symbol-level radio measurements in response to the event detection threshold being met; and sending, by the base station to a controller of a radio access network of a wireless network, multiple symbol-level radio measurement reports corresponding to the multiple symbol-level radio measurements.

Example 11. The method according to example 10, wherein the multiple symbol-level radio measurement reports are performed over a single second.

Example 12. The method according to one of examples 10 or 11, further comprising receiving, by the base station from the controller of the radio access network, an installation of the event detection threshold, and performing the determining that an event has been detected based on the installed event detection threshold.

Example 13. A method, comprising: causing, by a controller of a radio access network of a wireless network, channel sensing in a region covered by one or more antenna arrays that provide a three-dimensional view of segments of a cell, in order to form a mapping between the segments and beams able to be formed by a base station and used by the controller; causing, by the controller of the radio access network, radio measurements to be performed by the base station, using the beams, of the segments of the cell during a steady state phase without an interferer in the region, and during a state of interest having one or more interferers in the region; performing, by the controller of the radio access network, at least correlation of the radio measurements between the steady state phase and the state of interest to determine a mapping from the segments to corresponding anomaly signatures; and using, by the controller of the radio access network, the mapping from the segments to corresponding anomaly signatures and the mapping between the segments and beams to perform mitigation of interference in the region.

Example 14. The method according to example 13, wherein the performing at least correlation of the radio measurements uses manually tagged data samples for one or both of the steady state phase and the state of interest, and wherein performing at least correlation uses the manually tagged data samples.

Example 15. The method according to any one of examples 13 or 14, wherein the performing at least correlation determines one or more of the following metrics to be used for the correlation: standard deviation in a radio frequency sensing metric; spatial localization of interferer signal captured on specific segments; frequency-domain localization of an interfere; or rate of arrival of interferer signal.

Example 16. The method according to any one of examples 13 to 15, wherein causing channel sensing in a region covered by one or more antenna arrays that provide a three-dimensional view of segments of a cell comprises: configuring a base station to create a grid of beams using the one or more antenna arrays to cover the region; studying patterns in the grid of beams and creating a profile of a number of the segments that can be employed in the cell encompassing at least part of the region; and mapping individual beams from beam sets in the grid of beams to a unique segment or segments in horizontal and vertical planes, and mapping data beams that address a given azimuth and elevation space to a segment; and causing the base station to perform radio frequency sensing for certain measurements per segment in order to perform the channel sensing.

Example 17. The method according to example 16, wherein the mapping the individual beams and the mapping data beams result in a table of segments, synchronization signal block index ranges, and data beam indexes.

Example 18. The method according to example 17, wherein: the method further comprises mapping, using the table, radio measurements in the steady state phase to corresponding segment indexes; the method further comprises mapping, using the table, radio measurements in the state of interest to corresponding segment indexes; and the performing, by the controller of the radio access network, at least correlation compares data in certain indexes for steady state phase and the state of interest.

Example 19. The method according to example 18, wherein: performing at least correlation of the radio measurements between the steady state phase and the state of interest comprises determining for individual segments that there is a deviation above a threshold between a distribution of a metric taken in the steady state phase and a corresponding distribution of the metric taken in the state of interest to map individual segments meeting the threshold as part of the anomaly signatures.

Example 20. The method according to example 16, wherein: causing channel sensing further comprises: determining that a profile of interfering signals is known; and capturing the interfering signals by employing customized beam sets using the one or more antenna arrays; and using the customized beam sets for performing the radio measurements.

Example 21. A method, comprising: performing, by a base station under configuration of a controller of a radio access network of a wireless network, channel sensing in a region covered by one or more antenna arrays coupled to the base station that provide a three-dimensional view of segments of a cell, in order to form a mapping by the base station between the segments and beams; reporting by the base station information from the channel sensing to the controller; performing, by the base station under configuration by the controller, radio measurements, using the beams, of the segments of the cell during a steady state phase without an interferer in the region, and during a state of interest having one or more interferers in the region; reporting the radio measurements from the base station to the controller; and controlling, by the base station using configuration from the controller, at least the beams to perform mitigation of interference in the region.

Example 22. The method according to example 21, wherein performing channel sensing comprises: creating, by the base station using configuration from the controller, a grid of beams using the one or more antenna arrays to cover the region; receiving, by the base station from the controller, a profile, based on patterns in the grid of beams, of a number of the segments that can be employed in the cell encompassing at least part of the region; and receiving, by the base station from the controller, a mapping of individual beams from beam sets in the grid of beams to a unique segment or segments in horizontal and vertical planes, and a mapping of data beams that address a given azimuth and elevation space to a segment; and performing, by the base station using configuration from the controller including the mapping of individual beams and mapping of data beams, radio frequency sensing for certain measurements per segment in order to perform the channel sensing.

Example 23. The method according to example 22, wherein the controlling at least the beams to perform mitigation of interference in the region uses at least the mapping of individual beams and mapping of data beams.

Example 24. A computer program, comprising code for performing the methods of any of examples 1 to 23, when the computer program is run on a computer.

Example 25. The computer program according to example 24, wherein the computer program is a computer program product comprising a computer-readable medium bearing computer program code embodied therein for use with the computer.

Example 26. The computer program according to example 24, wherein the computer program is directly loadable into an internal memory of the computer.

Example 27. An apparatus, comprising: one or more processors; and one or more memories storing instructions that, when executed by the one or more processors, cause the apparatus at least to perform: detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer; and performing, by the controller of the radio access network, mitigation of interference in the one or more segments.

Example 28. The apparatus of example 27, wherein the performing mitigation of interference in the one or more segments comprises performing one or more of the following: causing PRB blanking of one or more beams able to serve the one or more segments; causing SSB muting or beam set blacklisting; or causing traffic steering of users using the one or more segments from a current operator layer to another operator layer.

Example 29. The apparatus according to example 27 or 28, wherein the detecting the interferer is present in the region comprises detecting the interferer is present in the region because the one or more segments have an anomaly signature having at least deviation in radio measurements from steady state values in a section of bandwidth in corresponding segment.

Example 30. The apparatus according to any one of examples 27 to 28, wherein: the one or more memories further store instructions that, when executed by the one or more processors, cause the apparatus at least to perform: receiving, by the controller of the radio access network, multiple symbol-level radio measurement reports from a base station collecting the multiple symbol-level radio measurement reports in the region covered by the one or more antenna arrays; the detecting the interferer is present further comprises comparing the received multiple symbol-level radio measurement reports with anomaly signatures corresponding to the segments of the cell to determine the one or more segments.

Example 31. The apparatus according to example 30, wherein the multiple symbol-level radio measurement reports are performed over a single second.

Example 32. The apparatus according to one of examples 30 or 31, wherein the one or more memories further store instructions that, when executed by the one or more processors, cause the apparatus at least to perform: installing, by the controller of the radio access network, an event detection threshold in the base station to be used to cause the base station to make radio measurements for corresponding multiple symbol-level radio measurement reports in response to the event detection threshold being met by a measurement taken by the base station.

Example 33. The apparatus according to one of examples 30 to 32, wherein the one or more memories further store instructions that, when executed by the one or more processors, cause the apparatus at least to perform making by the controller a decision to apply a particular mitigation based at least on the detecting, wherein the performing mitigation performs mitigation using the particular mitigation, and wherein the particular mitigation is performed for a time period, and then is halted at least until another interferer is detected.

Example 34. The apparatus according to example 33, wherein a time period from the detecting to the making the decision is performed within seconds, whereas the time period when the particular mitigation is performed encompasses minutes or hours.

Example 35. The apparatus according to any one of examples 27 to 34, wherein the controller of a radio access network of a wireless network comprises a near-real-time radio access network intelligent controller.

Example 36. An apparatus, comprising: one or more processors; and one or more memories storing instructions that, when executed by the one or more processors, cause the apparatus at least to perform: determining, at a base station controlling one or more antenna arrays that provide a three-dimensional view of segments of a cell in a wireless network, that an event has been detected because one or more radio measurements of the segments of the cell meet an event detection threshold; performing by the base station multiple symbol-level radio measurements in response to the event detection threshold being met; and sending, by the base station to a controller of a radio access network of a wireless network, multiple symbol-level radio measurement reports corresponding to the multiple symbol-level radio measurements.

Example 37. The apparatus according to example 36, wherein the multiple symbol-level radio measurement reports are performed over a single second.

Example 38. The apparatus according to one of examples 36 or 37, wherein the one or more memories further store instructions that, when executed by the one or more processors, cause the apparatus at least to perform: receiving, by the base station from the controller of the radio access network, an installation of the event detection threshold, and performing the determining that an event has been detected based on the installed event detection threshold.

Example 39. An apparatus, comprising: one or more processors; and one or more memories storing instructions that, when executed by the one or more processors, cause the apparatus at least to perform: causing, by a controller of a radio access network of a wireless network, channel sensing in a region covered by one or more antenna arrays that provide a three-dimensional view of segments of a cell, in order to form a mapping between the segments and beams able to be formed by a base station and used by the controller; causing, by the controller of the radio access network, radio measurements to be performed by the base station, using the beams, of the segments of the cell during a steady state phase without an interferer in the region, and during a state of interest having one or more interferers in the region; performing, by the controller of the radio access network, at least correlation of the radio measurements between the steady state phase and the state of interest to determine a mapping from the segments to corresponding anomaly signatures; and using, by the controller of the radio access network, the mapping from the segments to corresponding anomaly signatures and the mapping between the segments and beams to perform mitigation of interference in the region.

Example 40. The apparatus according to example 39, wherein the performing at least correlation of the radio measurements uses manually tagged data samples for one or both of the steady state phase and the state of interest, and wherein performing at least correlation uses the manually tagged data samples.

Example 41. The apparatus according to any one of examples 39 or 40, wherein the performing at least correlation determines one or more of the following metrics to be used for the correlation: standard deviation in a radio frequency sensing metric; spatial localization of interferer signal captured on specific segments; frequency-domain localization of an interfere; or rate of arrival of interferer signal.

Example 42. The apparatus according to any one of examples 39 to 41, wherein causing channel sensing in a region covered by one or more antenna arrays that provide a three-dimensional view of segments of a cell comprises: configuring a base station to create a grid of beams using the one or more antenna arrays to cover the region; studying patterns in the grid of beams and creating a profile of a number of the segments that can be employed in the cell encompassing at least part of the region; and mapping individual beams from beam sets in the grid of beams to a unique segment or segments in horizontal and vertical planes, and mapping data beams that address a given azimuth and elevation space to a segment; and causing the base station to perform radio frequency sensing for certain measurements per segment in order to perform the channel sensing.

Example 43. The apparatus according to example 42, wherein the mapping the individual beams and the mapping data beams result in a table of segments, synchronization signal block index ranges, and data beam indexes.

Example 44. The apparatus according to example 43, wherein: the one or more memories further store instructions that, when executed by the one or more processors, cause the apparatus at least to perform: mapping, using the table, radio measurements in the steady state phase to corresponding segment indexes; the one or more memories further store instructions that, when executed by the one or more processors, cause the apparatus at least to perform: mapping, using the table, radio measurements in the state of interest to corresponding segment indexes; and the performing, by the controller of the radio access network, at least correlation compares data in certain indexes for steady state phase and the state of interest.

Example 45. The apparatus according to example 44, wherein: performing at least correlation of the radio measurements between the steady state phase and the state of interest comprises determining for individual segments that there is a deviation above a threshold between a distribution of a metric taken in the steady state and a corresponding distribution of the metric taken in the state of interest to map individual segments meeting the threshold as part of the anomaly signatures.

Example 46. The apparatus according to example 42, wherein: causing channel sensing further comprises: determining that a profile of interfering signals is known; and capturing the interfering signals by employing customized beam sets using the one or more antenna arrays; and using the customized beam sets for performing the radio measurements.

Example 47. An apparatus, comprising: one or more processors; and one or more memories storing instructions that, when executed by the one or more processors, cause the apparatus at least to perform: performing, by a base station under configuration of a controller of a radio access network of a wireless network, channel sensing in a region covered by one or more antenna arrays coupled to the base station that provide a three-dimensional view of segments of a cell, in order to form a mapping by the base station between the segments and beams; reporting by the base station information from the channel sensing to the controller; performing, by the base station under configuration by the controller, radio measurements, using the beams, of the segments of the cell during a steady state phase without an interferer in the region, and during a state of interest having one or more interferers in the region; reporting the radio measurements from the base station to the controller; and controlling, by the base station using configuration from the controller, at least the beams to perform mitigation of interference in the region.

Example 48. The apparatus according to example 47, wherein performing channel sensing comprises: creating, by the base station using configuration from the controller, a grid of beams using the one or more antenna arrays to cover the region; receiving, by the base station from the controller, a profile, based on patterns in the grid of beams, of a number of the segments that can be employed in the cell encompassing at least part of the region; and receiving, by the base station from the controller, a mapping of individual beams from beam sets in the grid of beams to a unique segment or segments in horizontal and vertical planes, and a mapping of data beams that address a given azimuth and elevation space to a segment; and performing, by the base station using configuration from the controller including the mapping of individual beams and mapping of data beams, radio frequency sensing for certain measurements per segment in order to perform the channel sensing.

Example 49. The apparatus according to example 48, wherein the controlling at least the beams to perform mitigation of interference in the region uses at least the mapping of individual beams and mapping of data beams.

Example 50. An apparatus, comprising means for performing: detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer; and performing, by the controller of the radio access network, mitigation of interference in the one or more segments.

Example 51. An apparatus, comprising means for performing: determining, at a base station controlling one or more antenna arrays that provide a three-dimensional view of segments of a cell in a wireless network, that an event has been detected because one or more radio measurements of the segments of the cell meet an event detection threshold; performing by the base station multiple symbol-level radio measurements in response to the event detection threshold being met; and sending, by the base station to a controller of a radio access network of a wireless network, multiple symbol-level radio measurement reports corresponding to the multiple symbol-level radio measurements.

Example 52. An apparatus, comprising means for performing: causing, by a controller of a radio access network of a wireless network, channel sensing in a region covered by one or more antenna arrays that provide a three-dimensional view of segments of a cell, in order to form a mapping between the segments and beams able to be formed by a base station and used by the controller; causing, by the controller of the radio access network, radio measurements to be performed by the base station, using the beams, of the segments of the cell during a steady state phase without an interferer in the region, and during a state of interest having one or more interferers in the region; performing, by the controller of the radio access network, at least correlation of the radio measurements between the steady state phase and a state of interest to determine a mapping from the segments to corresponding anomaly signatures; and using, by the controller of the radio access network, the mapping from the segments to corresponding anomaly signatures and the mapping between the segments and beams to perform mitigation of interference in the region.

Example 53. An apparatus, comprising means for performing: performing, by a base station under configuration of a controller of a radio access network of a wireless network, channel sensing in a region covered by one or more antenna arrays coupled to the base station that provide a three-dimensional view of segments of a cell, in order to form a mapping by the base station between the segments and beams; reporting by the base station information from the channel sensing to the controller; performing, by the base station under configuration by the controller, radio measurements, using the beams, of the segments of the cell during a steady state phase without an interferer in the region, and during a state of interest having one or more interferers in the region; reporting the radio measurements from the base station to the controller; and controlling, by the base station using configuration from the controller, at least the beams to perform mitigation of interference in the region.

Example 54. The apparatus of any of examples 50 to 53, wherein the means comprises: at least one processor; and at least one memory including computer program code, the at least one memory and computer program code configured to, with the at least one processor, cause the performance of the apparatus.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 155 or other device) that may be any media or means that can contain, store, and/or transport the instructions for use by or in connection with an instruction execution system, apparatus, or device, such as a computer. A computer-readable storage medium does not comprise propagating signals, e.g., is non-transitory. The term "non-transitory," as used herein, is a limitation of the medium itself (i.e., tangible, not a signal) as opposed to a limitation on data storage persistency (e.g., RAM vs. ROM).

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

~ about
3D three-dimensional
5G fifth generation
AI artificial intelligence
avg average
CBRS Citizens Broadband Radio Service
CQI channel quality indicator
DCSS dynamic channel signal sensing
DL downlink
EIRP Effective Isotropic Radiated Power
eNB (or eNodeB) evolved Node B (e.g., an LTE base station)
FR1 frequency range 1
GHz gigaHertz
gNB (or gNodeB) base station for 5G/NR, i.e., a node providing NR user plane and control plane protocol terminations towards the UE, and connected via the NG interface to the 5GC
GoB grid of beams
I/F interface
LTE long term evolution
MIB master information block
ML machine learning
mMIMO massive MIMO
Near-RT RIC Near real-time RAN intelligent controller
ng or NG next generation
NR new radio
N/W or NW network
PMI precoding matrix indictor
PRB physical resource block
PSS Primary Synchronization Sequence
RAN radio access network
RIC RAN intelligent controller
RSRP Reference Signal Received Power
RSRQ Reference Signal Received Quality
RSSI Received Signal Strength Indicator
RSSI/PRB RSSI per PRB
RT real-time
RU radio unit
Rx receiver
SMO Service Management & Orchestrator
SOI state of interest
SSB synchronization signal block
SSS Secondary Synchronization Sequence
TDD time division duplexing
Tx transmitter
UE user equipment (e.g., a wireless, typically mobile device)
UL uplink (from UE toward network)

What is claimed is:

1. An apparatus, comprising:
one or more processors; and
one or more memories storing instructions that, when executed by the one or more processors, cause the apparatus at least to perform:
detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer;
receiving, by the controller of the radio access network, multiple symbol-level radio measurement reports from a base station collecting the multiple symbol-level radio measurement reports in the region covered by the one or more antenna arrays,
wherein the detecting the interferer is present further comprises comparing the received multiple symbol-level radio measurement reports with anomaly signatures corresponding to the segments of the cell to determine the one or more segments; and
performing, by the controller of the radio access network, mitigation of interference in the one or more segments.

2. The apparatus of claim 1, wherein the performing mitigation of the interference in the one or more segments comprises performing one or more of the following:
causing PRB (physical resource block) blanking of one or more beams able to serve the one or more segments;
causing SSB (synchronous signal block) muting or beam set blacklisting; or
causing traffic steering of users using the one or more segments from a current operator layer to another operator layer.

3. The apparatus according to claim 1, wherein the detecting the interferer is present in the region comprises detecting the interferer is present in the region because the one or more segments have an anomaly signature having at least deviation in radio measurements from steady state values in a section of bandwidth in corresponding segment.

4. The apparatus according to claim 1, wherein the multiple symbol-level radio measurement reports are performed over a single second.

5. The apparatus according to claim 1, wherein the one or more memories further store instructions that, when executed by the one or more processors, cause the apparatus at least to perform: installing, by the controller of the radio access network, an event detection threshold in the base station to be used to cause the base station to make radio measurements for corresponding multiple symbol-level radio measurement reports in response to the event detection threshold being met by a measurement taken by the base station.

6. The apparatus according to claim 1, wherein the one or more memories further store instructions that, when executed by the one or more processors, cause the apparatus at least to perform: making by the controller a decision to apply a particular mitigation based at least on the detecting, wherein the performing mitigation performs mitigation using the particular mitigation, and wherein the particular mitigation is performed for a time period, and then is halted at least until another interferer is detected.

7. The apparatus according to claim 6, wherein a time period from the detecting to the making the decision is performed within seconds, whereas the time period when the particular mitigation is performed encompasses minutes or hours.

8. The apparatus according to claim 1, wherein the controller of the radio access network of the wireless network comprises a near-real-time radio access network intelligent controller.

9. A method, comprising:
- detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer;
- receiving, by the controller of the radio access network, multiple symbol-level radio measurement reports from a base station collecting the multiple symbol-level radio measurement reports in the region covered by the one or more antenna arrays,
- wherein the detecting the interferer is present further comprises comparing the received multiple symbol-level radio measurement reports with anomaly signatures corresponding to the segments of the cell to determine the one or more segments; and
- performing, by the controller of the radio access network, mitigation of interference in the one or more segments.

10. The method of claim 9, wherein the performing mitigation of the interference in the one or more segments comprises performing one or more of the following:
- causing PRB (physical resource block) blanking of one or more beams able to serve the one or more segments;
- causing SSB (synchronous signal block) muting or beam set blacklisting; or
- causing traffic steering of users using the one or more segments from a current operator layer to another operator layer.

11. The method according to claim 9, wherein the detecting the interferer is present in the region comprises detecting the interferer is present in the region because the one or more segments have an anomaly signature having at least deviation in radio measurements from steady state values in a section of bandwidth in corresponding segment.

12. The method according to claim 9, wherein the multiple symbol-level radio measurement reports are performed over a single second.

13. The method according to claim 9, further comprising:
- installing, by the controller of the radio access network, an event detection threshold in the base station to be used to cause the base station to make radio measurements for corresponding multiple symbol-level radio measurement reports in response to the event detection threshold being met by a measurement taken by the base station.

14. The method according to claim 9, wherein:
- the method further comprises making by the controller a decision to apply a particular mitigation based at least on the detecting; and
- the performing mitigation performs mitigation using the particular mitigation, and wherein the particular mitigation is performed for a time period, and then is halted at least until another interferer is detected.

15. The method according to claim 14, wherein a time period from the detecting to the making the decision is performed within seconds, whereas the time period when the particular mitigation is performed encompasses minutes or hours.

16. The method according to claim 9, wherein the controller of the radio access network of the wireless network comprises a near-real-time radio access network intelligent controller.

17. A non-transitory computer-readable storage medium comprising program instructions that, when executed by an apparatus, cause the apparatus to perform operations comprising:
- detecting, in a controller of a radio access network of a wireless network, an interferer is present in a region covered by one or more antenna arrays that provide a three-dimensional view of segments of a cell, the detecting using at least a mapping from the segments to corresponding anomaly signatures, and using radio measurements taken in the segments, to determine one or more segments affected by the interferer;
- receiving, by the controller of the radio access network, multiple symbol-level radio measurement reports from a base station collecting the multiple symbol-level radio measurement reports in the region covered by the one or more antenna arrays,
- wherein the detecting the interferer is present further comprises comparing the received multiple symbol-level radio measurement reports with anomaly signatures corresponding to the segments of the cell to determine the one or more segments; and
- performing, by the controller of the radio access network, mitigation of interference in the one or more segments.

18. The non-transitory computer-readable storage medium according to claim 17, further comprising: installing, by the controller of the radio access network, an event detection threshold in the base station to be used to cause the base station to make radio measurements for corresponding multiple symbol-level radio measurement reports in response to the event detection threshold being met by a measurement taken by the base station.

19. The non-transitory computer-readable storage medium according to claim 17, wherein:
- the operations further comprise making by the controller a decision to apply a particular mitigation based at least on the detecting; and
- the performing mitigation performs mitigation using the particular mitigation, and wherein the particular mitigation is performed for a time period, and then is halted at least until another interferer is detected.

20. The non-transitory computer-readable storage medium according to claim 17, wherein a time period from the detecting to the making the decision is performed within seconds, whereas the time period when the particular mitigation is performed encompasses minutes or hours.

* * * * *